(12) United States Patent
Liberti et al.

(10) Patent No.: US 9,806,549 B2
(45) Date of Patent: Oct. 31, 2017

(54) ACCESSORY FOR AN AEROSOL DELIVERY DEVICE AND RELATED METHOD AND COMPUTER PROGRAM PRODUCT

(71) Applicant: R. J. Reynolds Tobacco Company, Winston-Salem, NC (US)

(72) Inventors: Michael Andrew Liberti, Clemmons, NC (US); Quentin Paul Guenther, Jr., Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 245 days.

(21) Appl. No.: 14/046,464

(22) Filed: Oct. 4, 2013

(65) Prior Publication Data

US 2015/0097513 A1    Apr. 9, 2015

(51) Int. Cl.
*H02J 7/00* (2006.01)
*A24F 47/00* (2006.01)
*A24F 15/18* (2006.01)

(52) U.S. Cl.
CPC ............ *H02J 7/0054* (2013.01); *A24F 15/18* (2013.01); *A24F 47/00* (2013.01); *A24F 47/008* (2013.01); *H02J 7/0044* (2013.01); *Y10T 29/49117* (2015.01)

(58) Field of Classification Search
CPC ............ H02J 7/0054; H02J 7/00; A24F 47/00
USPC .................. 320/103, 107, 113, 115; 131/329
See application file for complete search history.

(56) References Cited

U.S. PATENT DOCUMENTS

| | | |
|---|---|---|
| D377,934 S | 2/1997 | Vondrak et al. |
| D519,523 S | 4/2006 | Chiu et al. |
| D534,153 S | 12/2006 | Naruki |
| D597,547 S | 8/2009 | Smith |
| D639,808 S | 6/2011 | Smith |
| D671,107 S | 11/2012 | Rothbaum et al. |

(Continued)

FOREIGN PATENT DOCUMENTS

| | | |
|---|---|---|
| AU | 2012 101 165 A4 | 9/2012 |
| EP | 2 253 233 | 11/2010 |

(Continued)

OTHER PUBLICATIONS

International Search Report and Written Opinion for corresponding International Application No. PCT/US2014/058610 dated Dec. 22, 2014.

(Continued)

*Primary Examiner* — Richard Isla Rodas
*Assistant Examiner* — Dung V Bui
(74) *Attorney, Agent, or Firm* — Womble Carlyle Sandridge & Rice, LLP

(57) ABSTRACT

The present disclosure relates to an accessory device usable with a portable electronic device and an aerosol delivery device. The accessory device may include a case configured to receive the portable electronic device and the aerosol delivery device therein. Further, the accessory device may include an interface that provides an electrical connection and/or a data connection between the aerosol delivery device and the portable electronic device. Thereby, the portable electronic device may charge the aerosol delivery device or vice versa and/or data may be exchanged therebetween. A related method and a computer program product are also provided.

22 Claims, 18 Drawing Sheets

(56) References Cited

U.S. PATENT DOCUMENTS

| | | | |
|---|---|---|---|
| D679,699 S | 4/2013 | Piedra et al. | |
| 2008/0020794 A1* | 1/2008 | Garon | A61B 5/14532 455/556.1 |
| 2008/0179113 A1 | 7/2008 | Carlson et al. | |
| 2009/0283103 A1 | 11/2009 | Nielsen et al. | |
| 2009/0320863 A1 | 12/2009 | Fernando et al. | |
| 2010/0124040 A1 | 5/2010 | Diebel et al. | |
| 2010/0307518 A1 | 12/2010 | Wang | |
| 2011/0265806 A1* | 11/2011 | Alarcon | A24F 47/00 131/273 |
| 2012/0260926 A1* | 10/2012 | Tu | A24F 47/008 131/329 |
| 2013/0220847 A1* | 8/2013 | Fisher et al. | 206/216 |
| 2014/0014125 A1* | 1/2014 | Fernando et al. | 131/328 |
| 2014/0270727 A1* | 9/2014 | Ampolini et al. | 392/387 |
| 2014/0355200 A1* | 12/2014 | Thiers | 361/679.41 |
| 2015/0097513 A1* | 4/2015 | Liberti | A24F 47/00 320/103 |

FOREIGN PATENT DOCUMENTS

| | | |
|---|---|---|
| JP | 2012-90427 | 5/2012 |
| JP | 2012090427 A * | 5/2012 |
| WO | WO 2013/102611 | 7/2013 |
| WO | WO 2013/102612 | 7/2013 |

OTHER PUBLICATIONS

Fox News; Tech; *Supersmoker e-cigarette that's also a phone and an MP3 player*; by Joanna Preston; published Feb. 28, 2014; website visited Mar. 11, 2014 http://www.foxnews.com/tech/2014/02/28/supersmoker-e-cigarette-is-also-phone-mp3-player/?intcmp=features.

International Preliminary Report on Patentability for corresponding International Application No. PCT/US2014/058610 dated Oct. 2, 2015.

* cited by examiner

FIG. 1

100
ACCESSORY FOR AN AEROSOL DELIVERY DEVICE AND RELATED METHOD AND COMPUTER PROGRAM PRODUCT

FIELD OF THE DISCLOSURE

The present disclosure relates to an accessory device for an aerosol delivery device, and more particularly to an accessory device including an interface configured to connect the aerosol delivery device to a portable electronic device. The aerosol delivery device may be configured to heat an aerosol precursor, which may be made or derived from tobacco or otherwise incorporate tobacco, to form an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al., U.S. patent application Ser. No. 13/432,406, filed Mar. 28, 2012, U.S. patent application Ser. No. 13/536,438, filed Jun. 28, 2012, U.S. patent application Ser. No. 13/602,871, filed Sep. 4, 2012, and U.S. patent application Ser. No. 13/647,000, filed Oct. 8, 2012, which are incorporated herein by reference.

Certain tobacco products that have employed electrical energy to produce heat for smoke or aerosol formation, and in particular, certain products that have been referred to as electronic cigarette products, have been commercially available throughout the world. Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; COHITA™, COLIBRI™, ELITE CLASSIC™, MAGNUM™, PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; GREEN SMOKE® by Green Smoke Inc. USA; GREENARETTE™ by Greenarette LLC; HALLIGAN™, HENDU™, JET™, MAXXQ™, PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC and VUSE® by R. J. Reynolds Vapor Company. Yet other electrically powered aerosol delivery devices, and in particular those devices that have been characterized as so-called electronic cigarettes, have been marketed under the tradenames BLU™; COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP® and SOUTH BEACH SMOKE™.

However, it may be desirable to provide aerosol delivery devices with additional functionality. In this regard, it may be desirable to integrate functionality of the aerosol delivery devices with existing devices to provide synergistic effects.

BRIEF SUMMARY OF THE DISCLOSURE

In one aspect an accessory device is provided. The accessory device may include a case defining a first cavity configured to receive a portable electronic device and a second cavity configured to receive at least a portion of an aerosol delivery device comprising a battery.

In some embodiments the case may be configured to receive a control body of the aerosol delivery device in the second cavity. Further, the case may be configured such that an indicator on the control body is visible when the control body is received in the second cavity. The case may additionally include a third cavity configured to receive a cartridge of the aerosol delivery device. The second cavity may define an opening at a longitudinal end of the case and the third cavity defines an opening at an opposing longitudinal end of the case. In some embodiments the case may include a front cover and a rear cover. The front cover and the rear cover may be configured to lock together in a closed configuration to retain the portable electronic device in the first cavity and allow for insertion and removal of the aerosol delivery device.

The accessory device may further comprise an interface configured to establish an electrical connection between the battery of the aerosol delivery device and the portable electronic device. The interface may be configured to cause the portable electronic device to charge the battery. The interface may be further configured to establish a data connection between the portable electronic device and the aerosol delivery device. The interface may be configured to allow for connection of an additional accessory device to the portable electronic device.

In another aspect an accessory device operation method is provided. The method may include providing an accessory device comprising a case and an interface. Further, the method may include providing for insertion of a portable electronic device and at least a portion of an aerosol delivery device comprising a battery into the case. Additionally, the method may include establishing an electrical connection between the portable electronic device and the battery of the aerosol delivery device through the interface.

In some embodiments the method may further comprise charging the battery of the aerosol delivery device through the electrical connection. The method may additionally include activating an indicator of the aerosol delivery device while charging the battery. The method may also include establishing a data connection between the portable electronic device and the aerosol delivery device through the interface of the accessory device. Additionally, the method may include transferring a plurality of usage data from the aerosol delivery device to the portable electronic device. In some embodiments the portable electronic device may be selected from a group consisting of a personal digital assistant, a cellular telephone, a smartphone, and a digital media player.

In an additional aspect a computer program product comprising at least one computer-readable storage medium having computer-executable program code portions stored therein is provided. The computer-executable program code portions may include program code instructions providing for charging a battery of an aerosol delivery device through an electrical connection established between a portable electronic device and the aerosol delivery device.

In some embodiments the computer program product may additionally include program code instructions for activating an indicator of the aerosol delivery device while charging the battery. Further, the computer program product may include program code instructions for establishing a data connection between the portable electronic device and the aerosol delivery device. The computer program product may additionally include program code instructions for transferring a plurality of usage data from the aerosol delivery device to the portable electronic device. Also, the computer program product may include program code instructions for indicating a remaining capacity of a cartridge of the aerosol delivery device. The computer program product may additionally include program code instructions for transferring a software update to the aerosol delivery device. In some embodiments the portable electronic device may be selected from a group consisting of a personal digital assistant, a cellular telephone, a smartphone, and a digital media player.

In a further aspect a method for charging is provided. The method may include establishing an electrical connection between a portable electronic device and a battery of an aerosol delivery device through an interface, wherein the portable electronic device is selected from a group consisting of a personal digital assistant, a cellular telephone, a smartphone, and a digital media player.

BRIEF DESCRIPTION OF THE FIGURES

Figure 2:
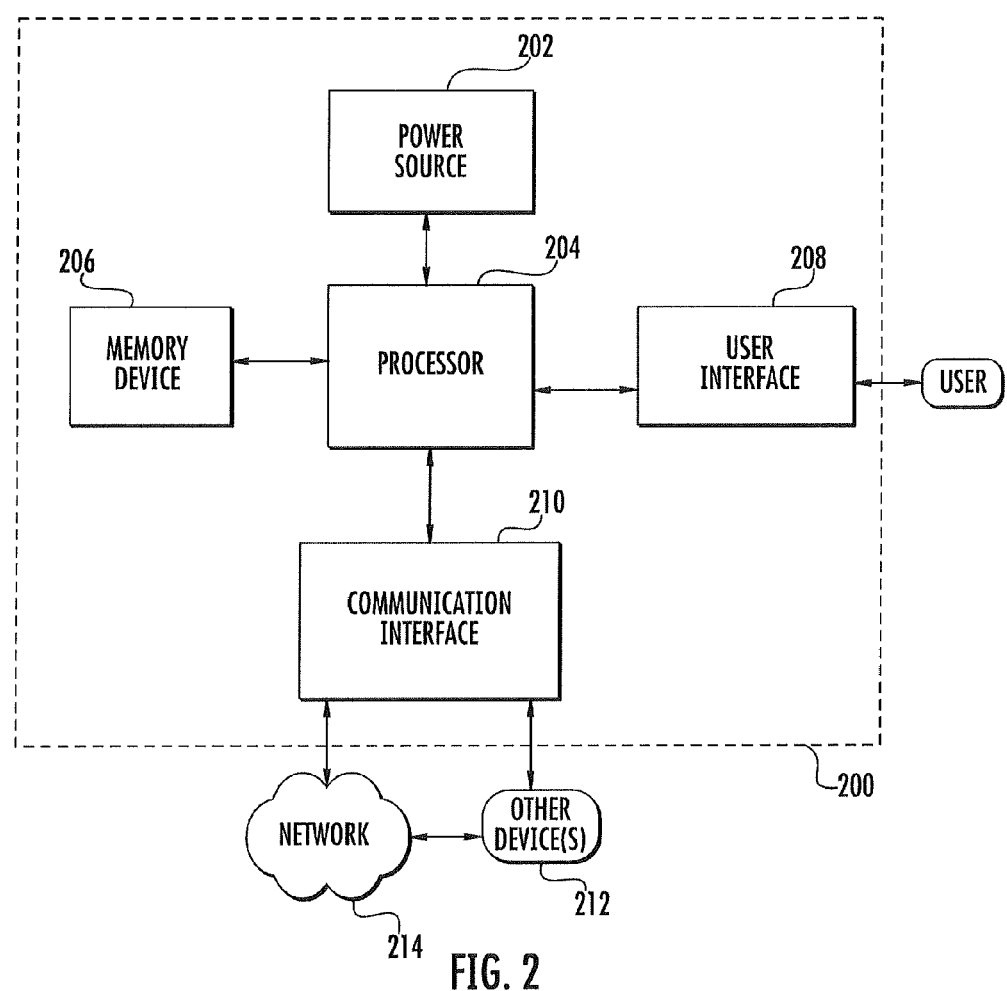
Figure 3:
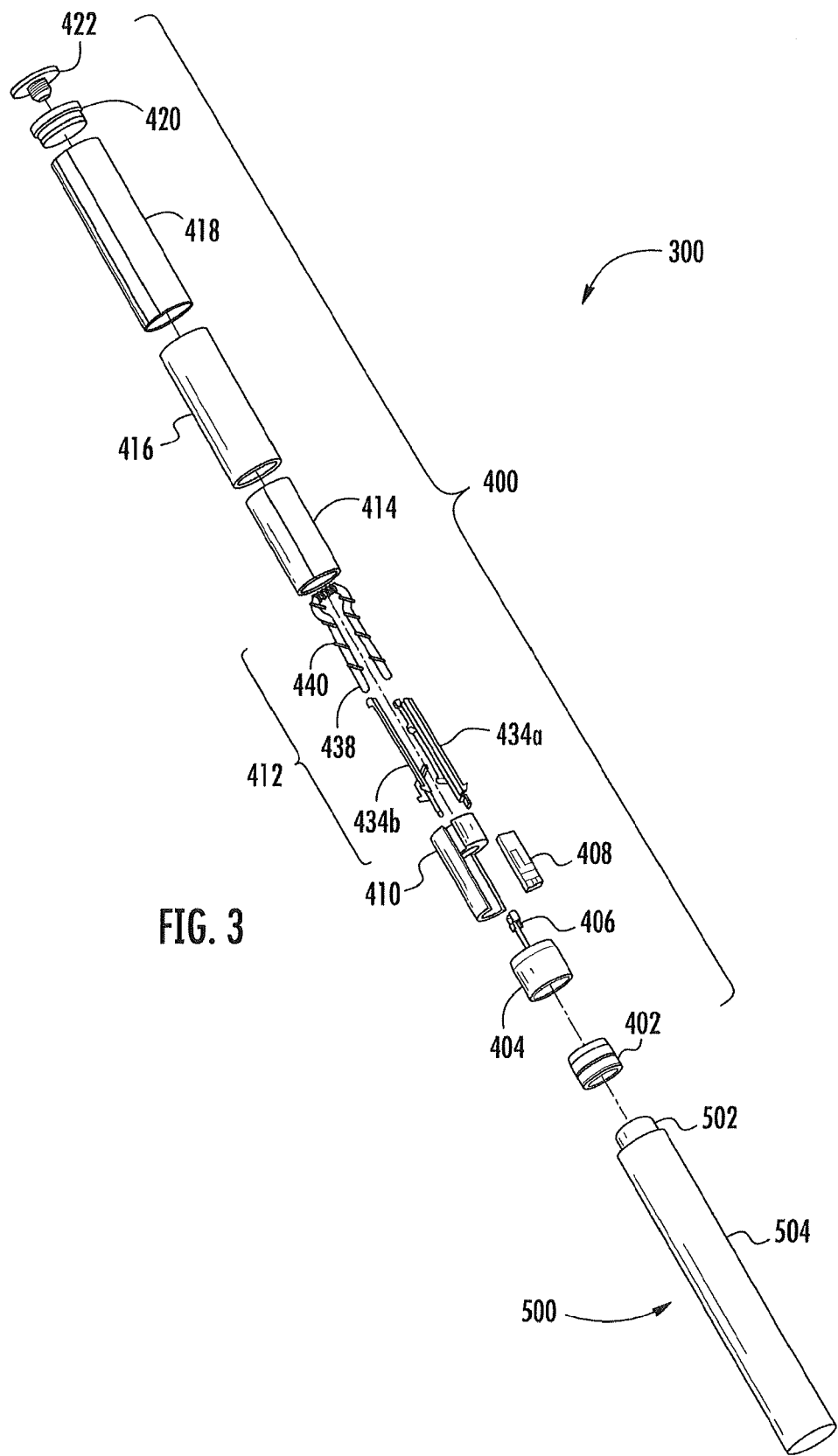
Figure 4:
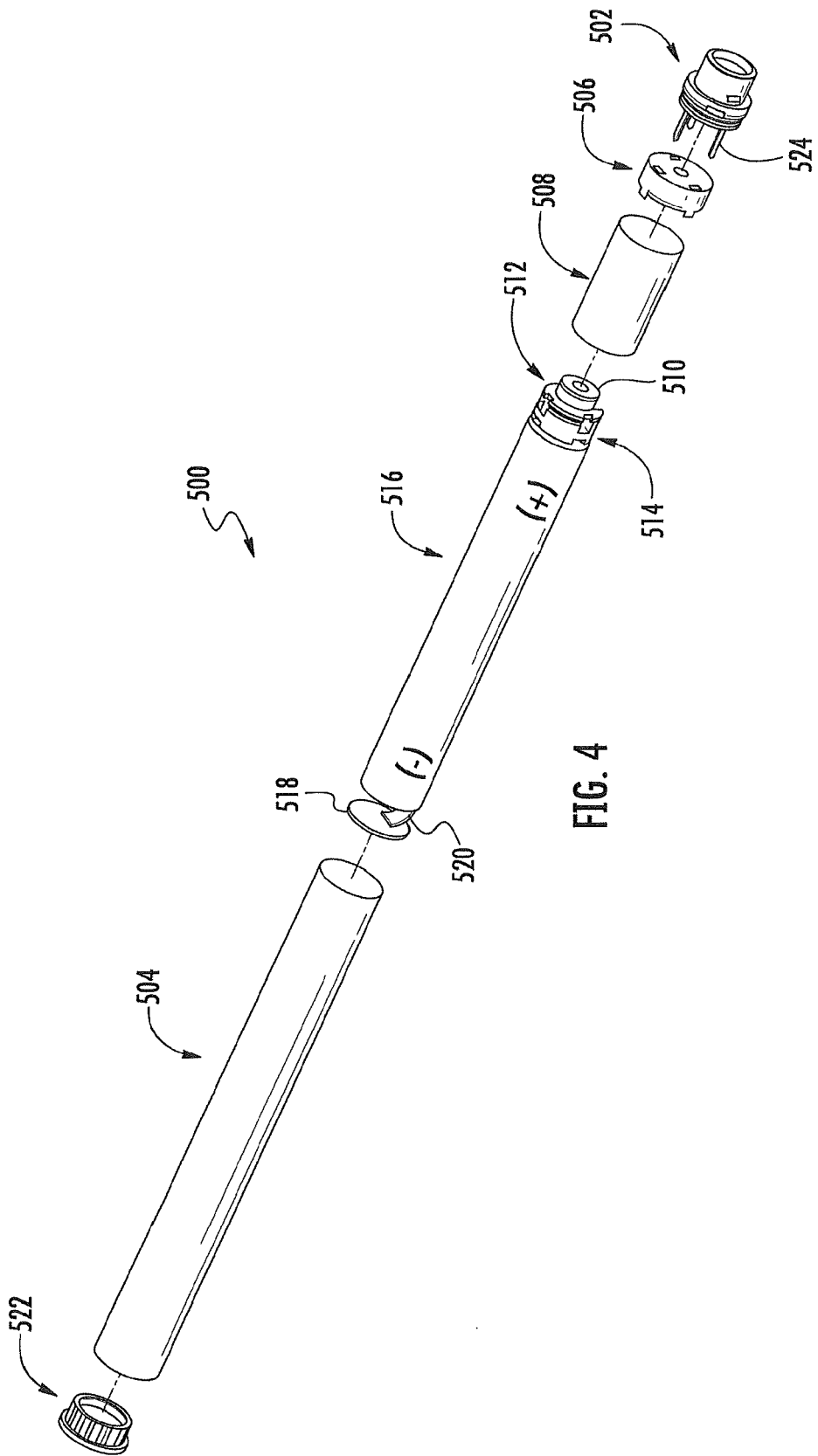
Figure 5:
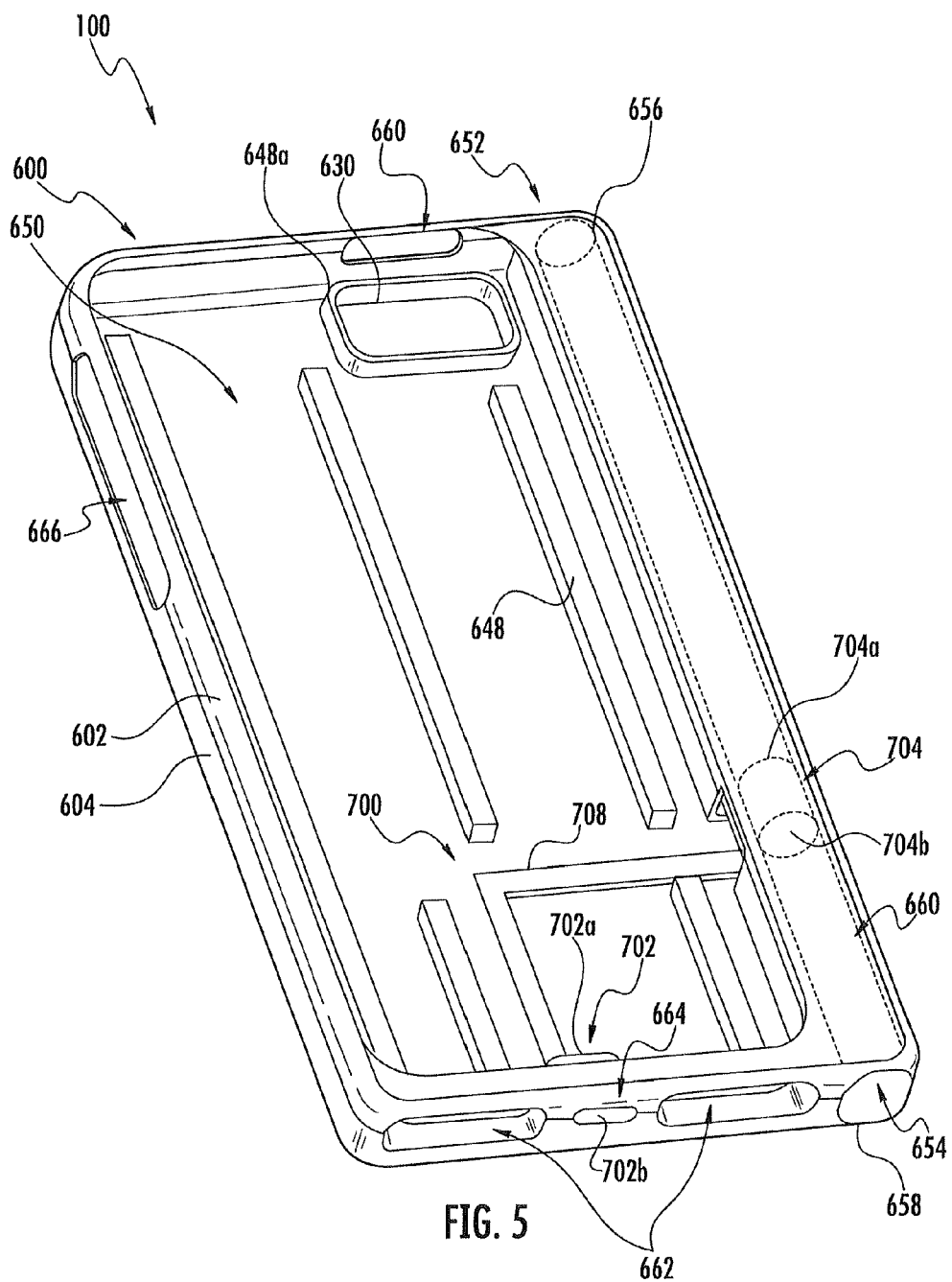
Figure 6:
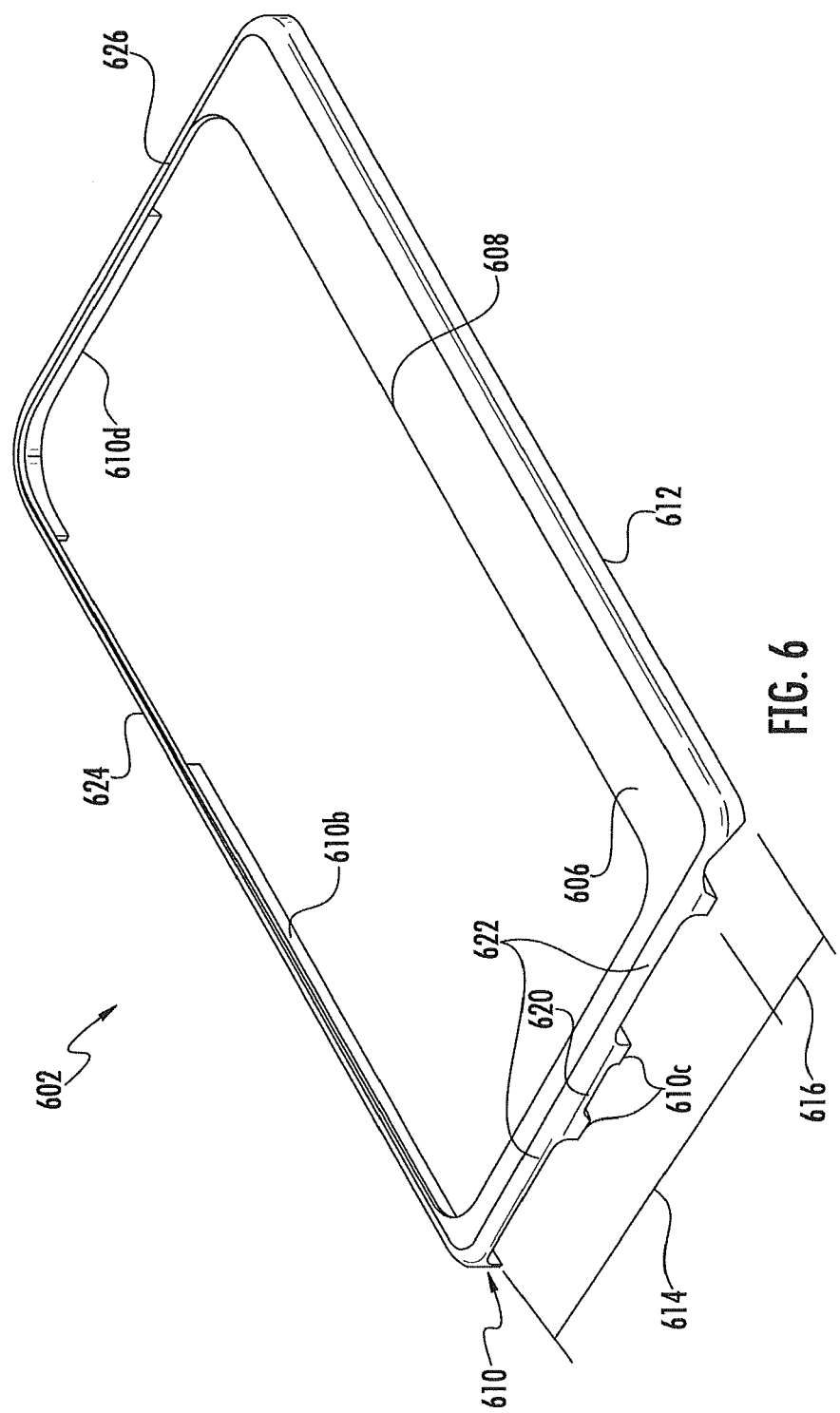
Figure 7:
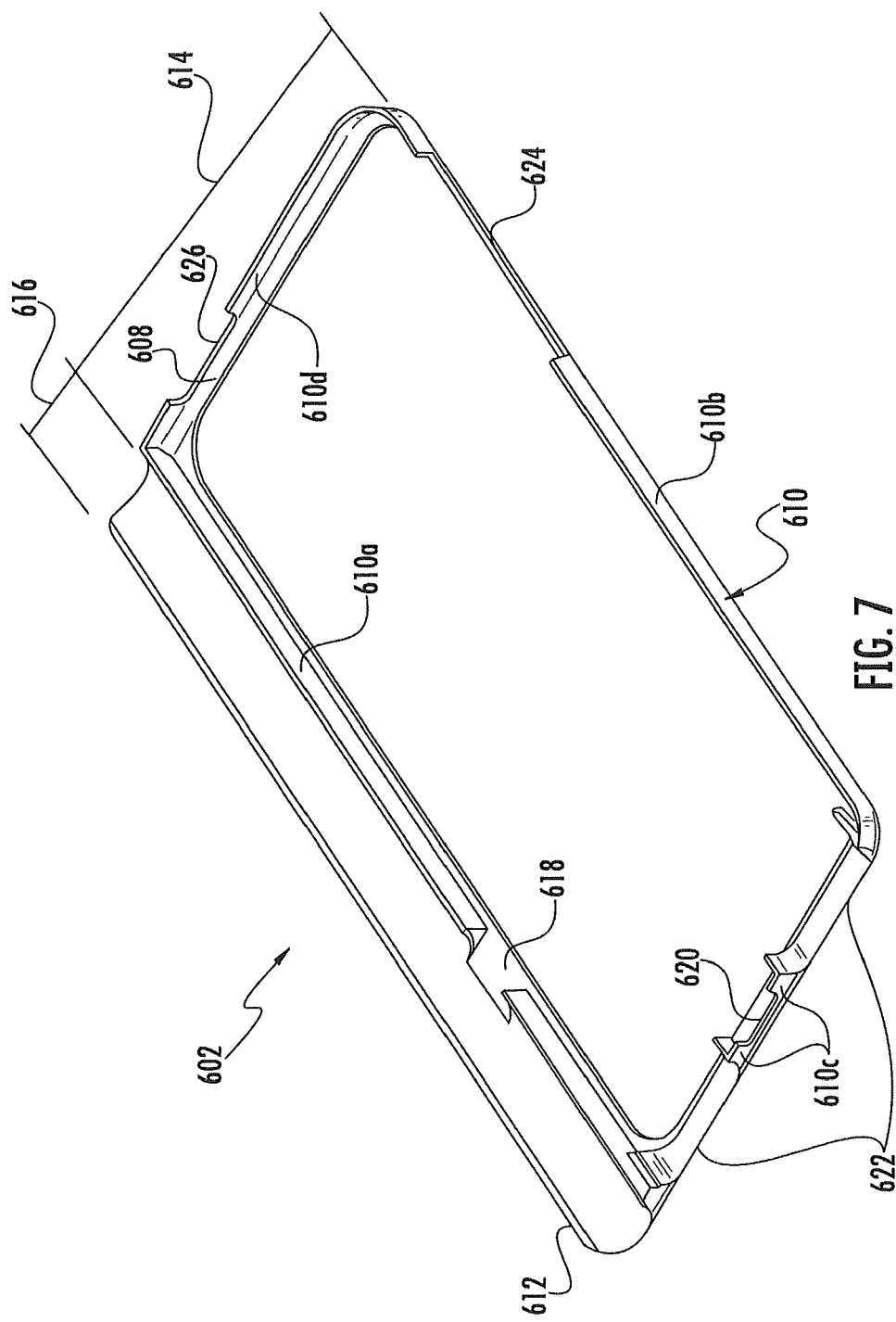
Figure 8:
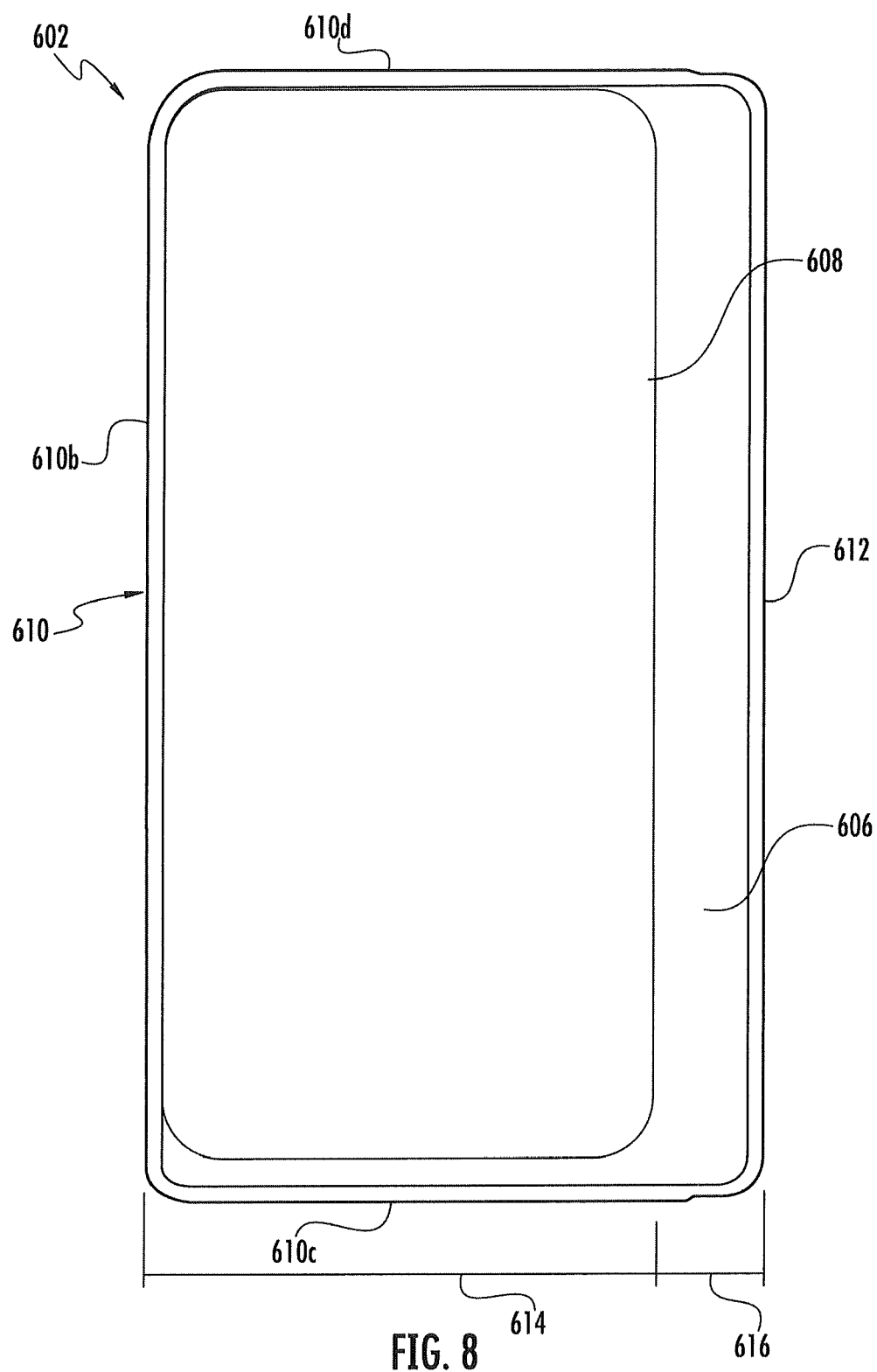
Figure 9:
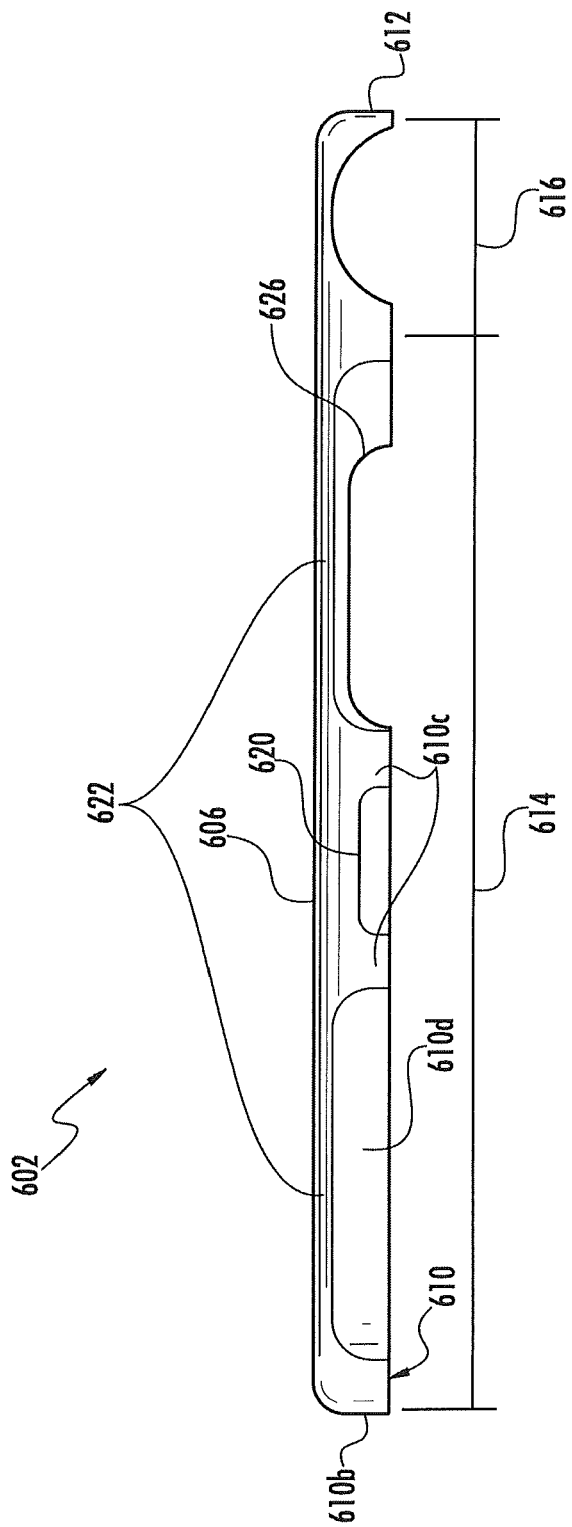
Figure 10:
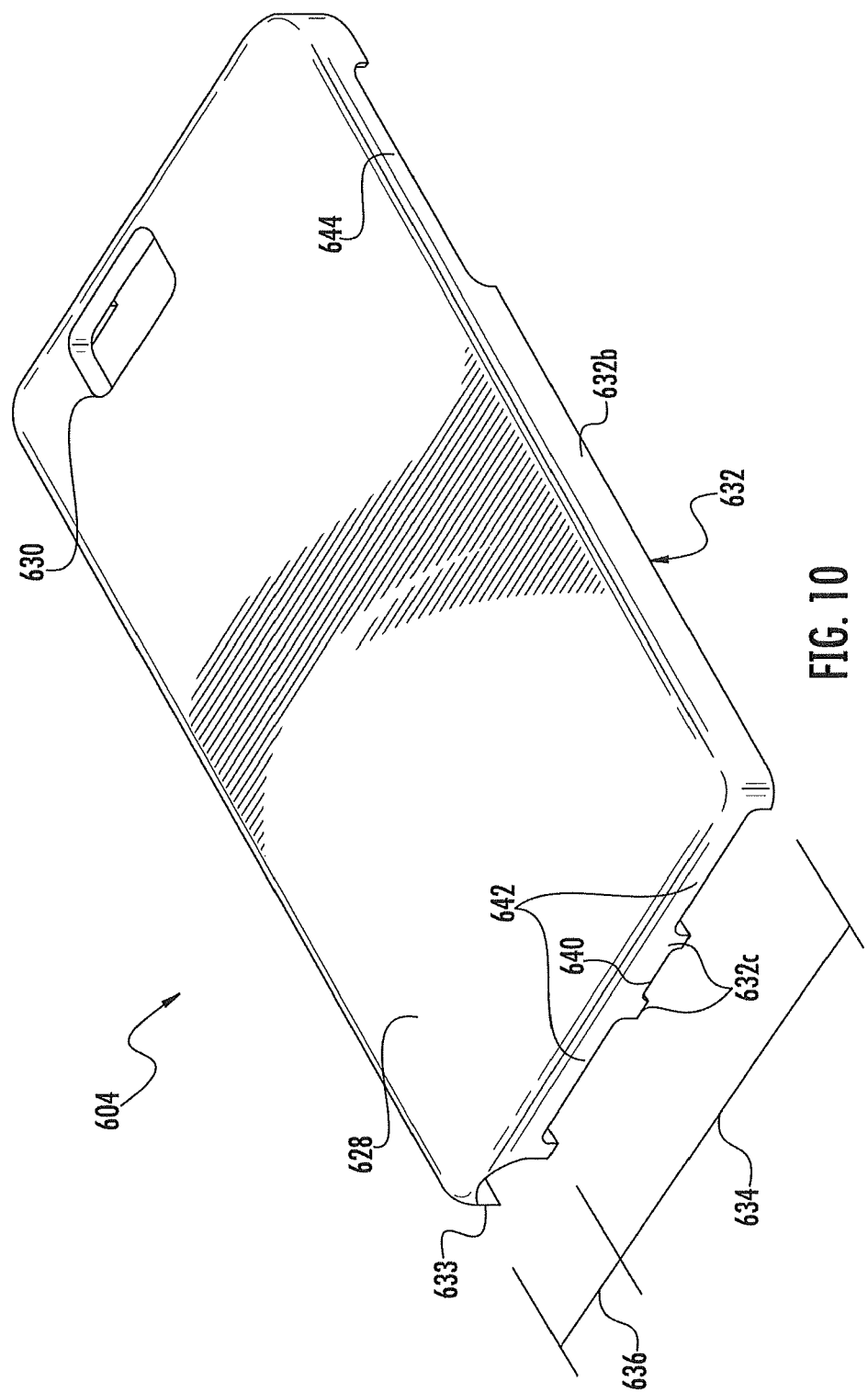
Figure 11:
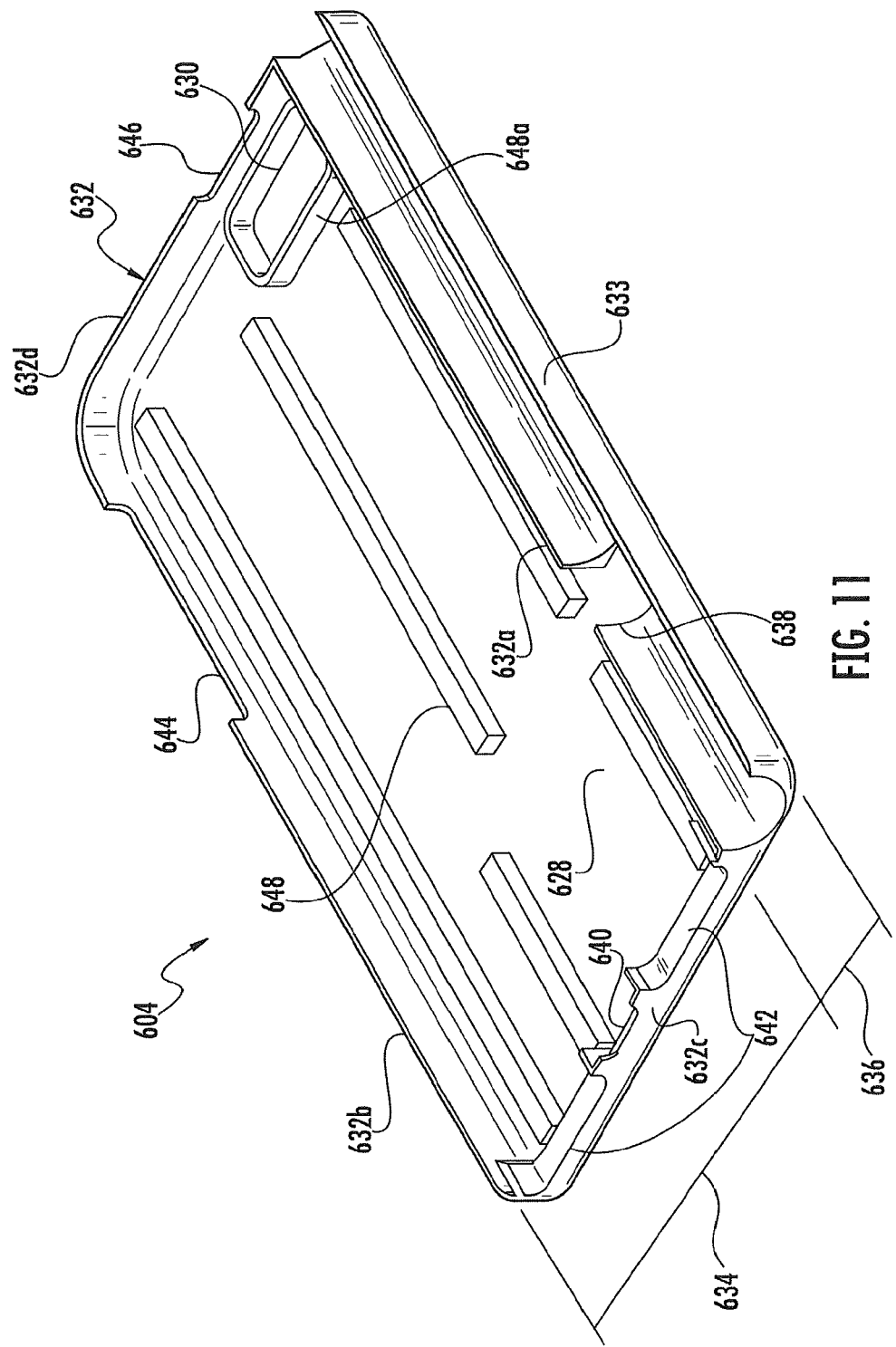
Figure 12:
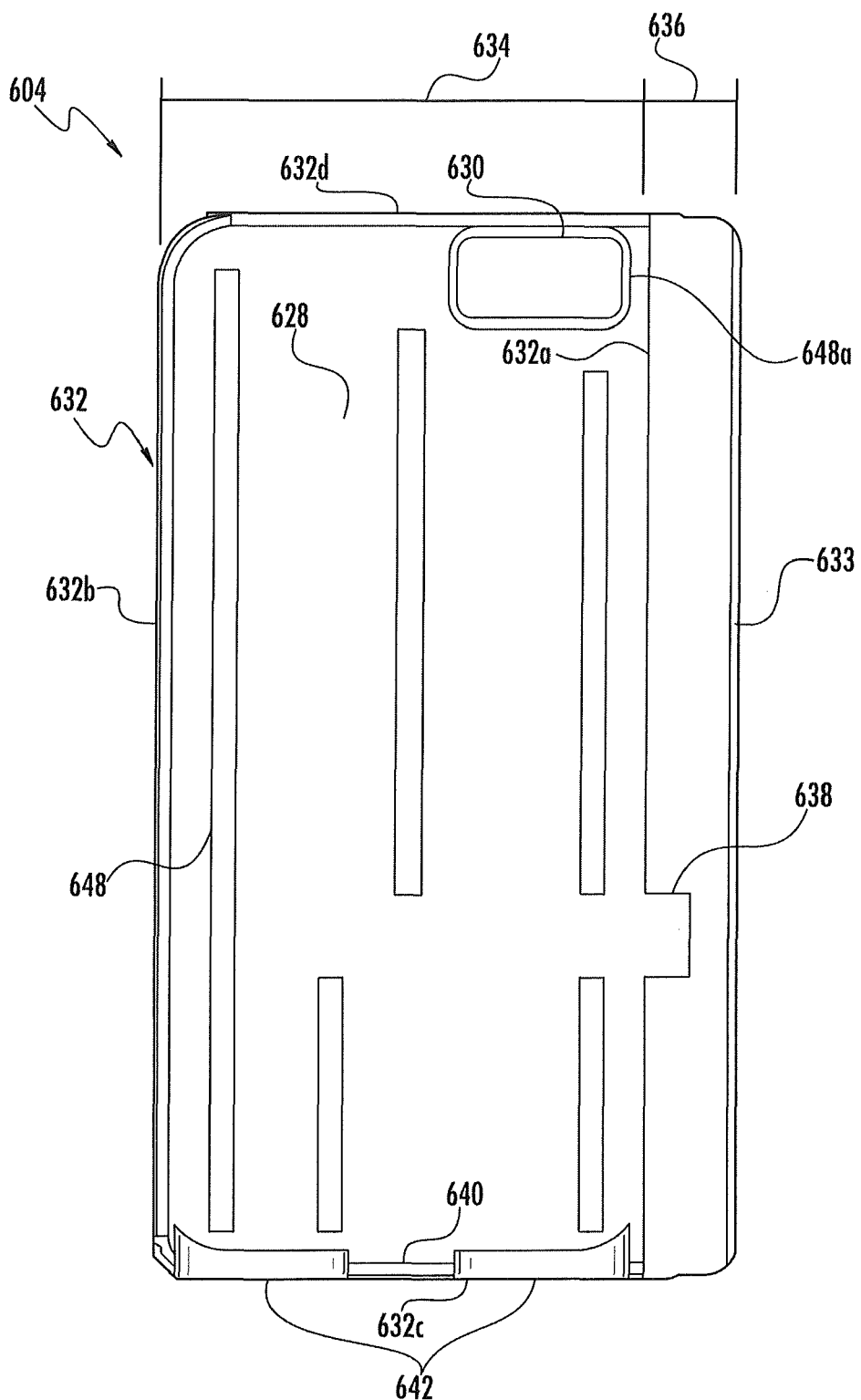
Figure 13:
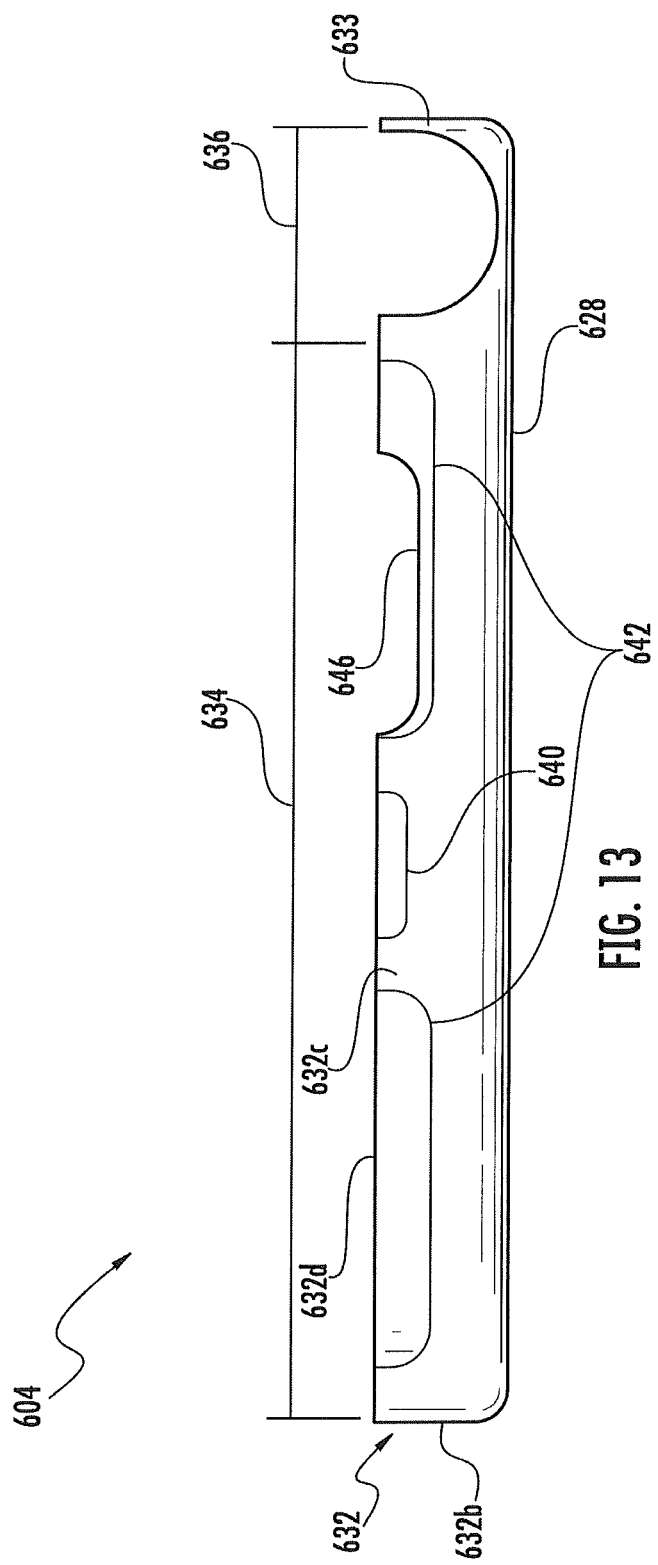
Figure 14:
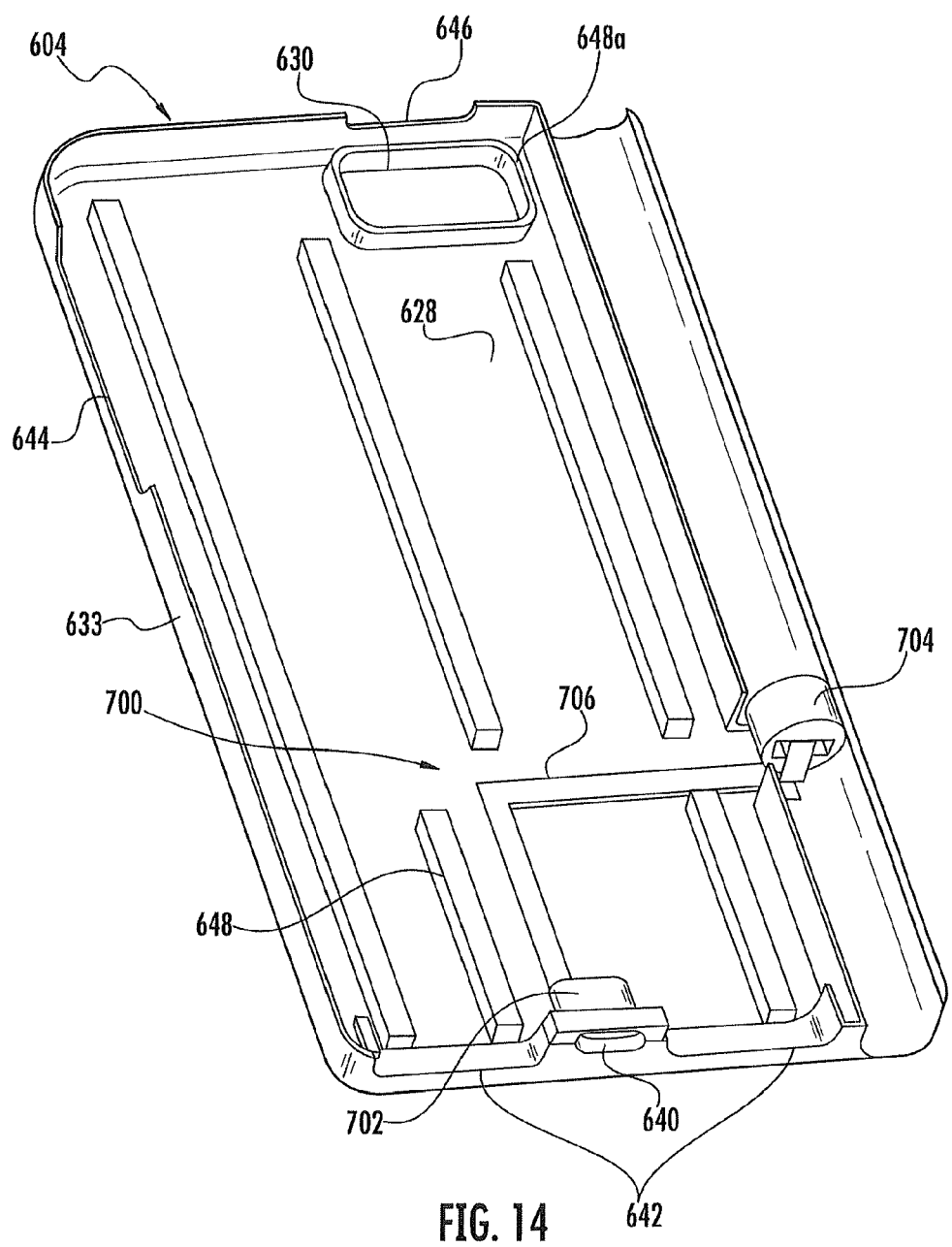
Figure 15:
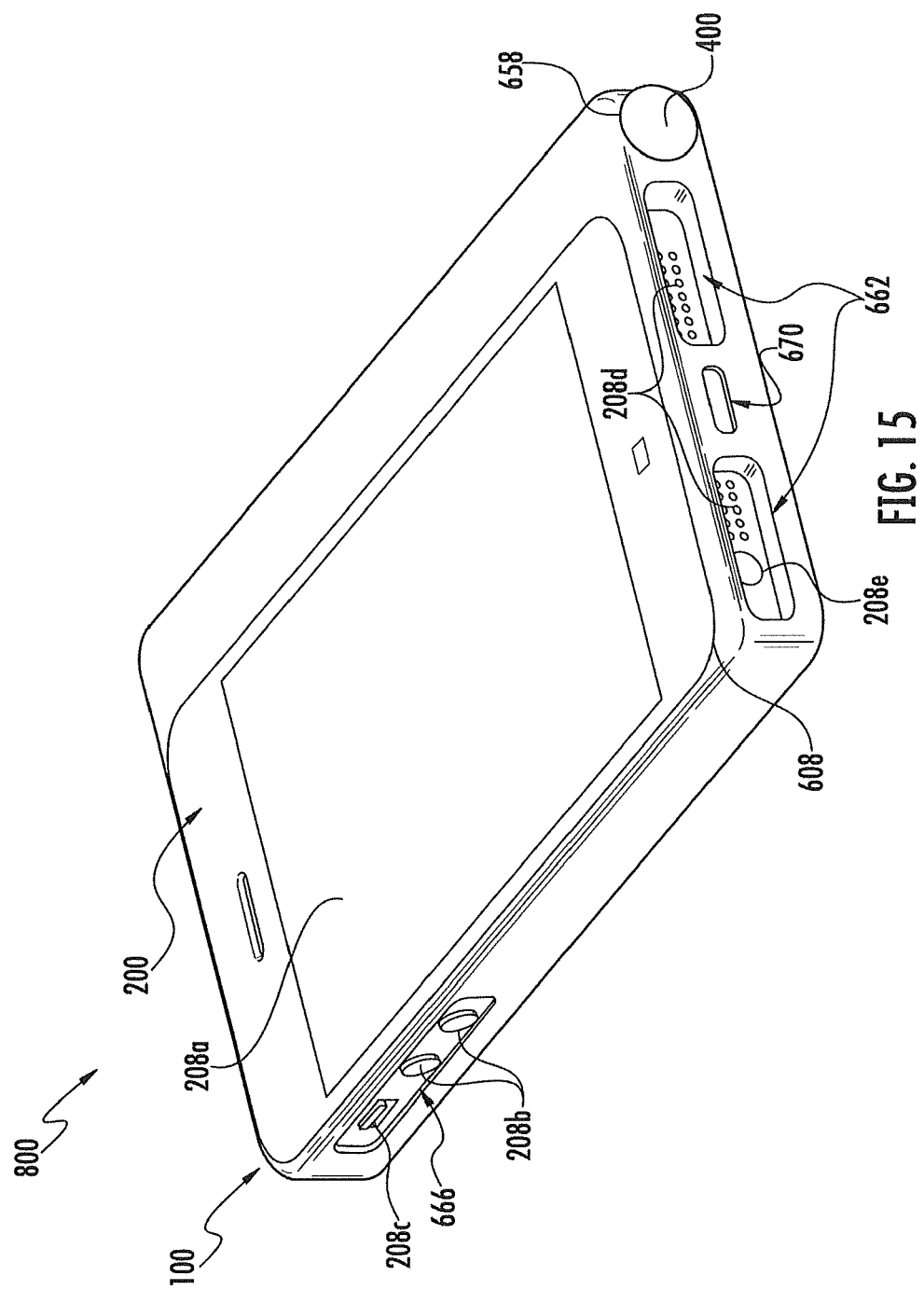
Figure 16:
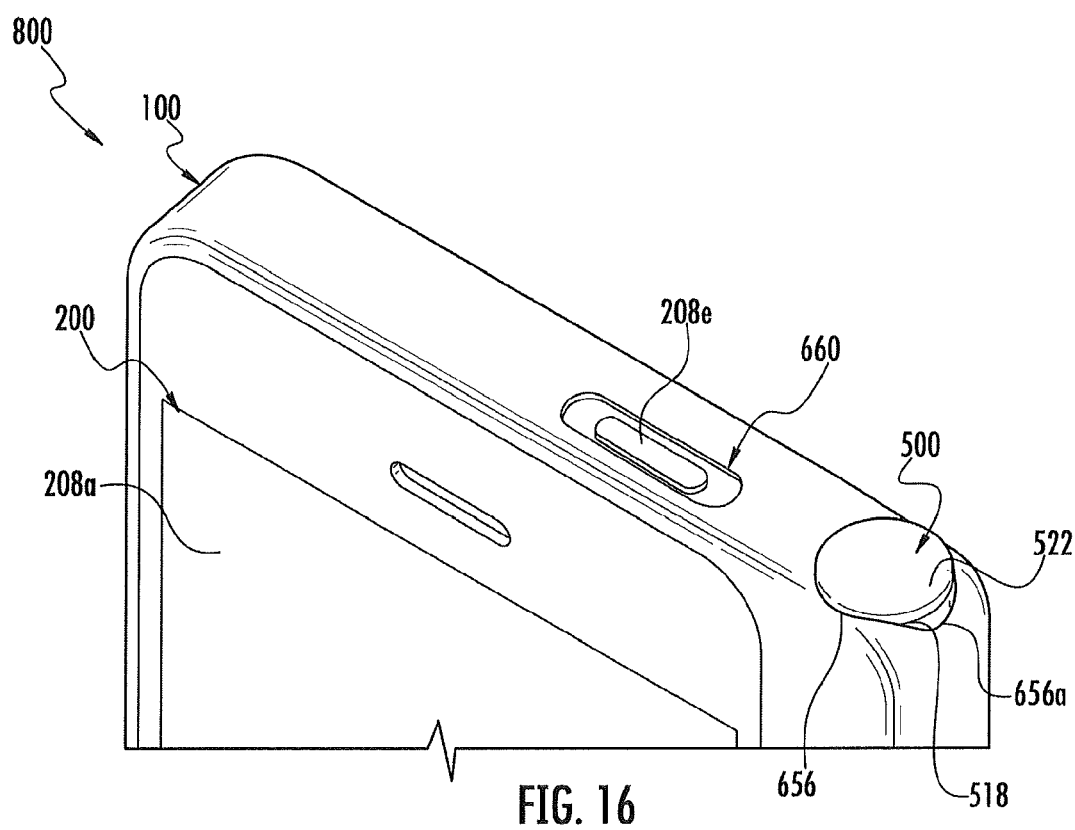
Figure 17:
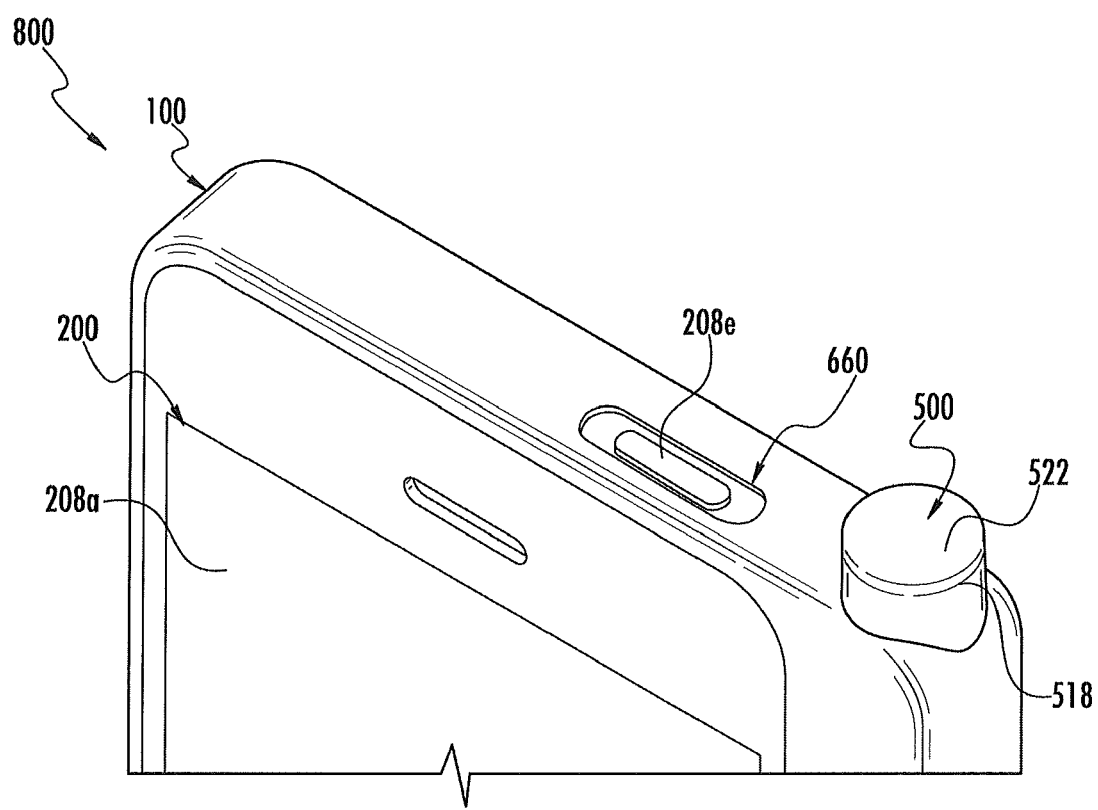
Figure 18:
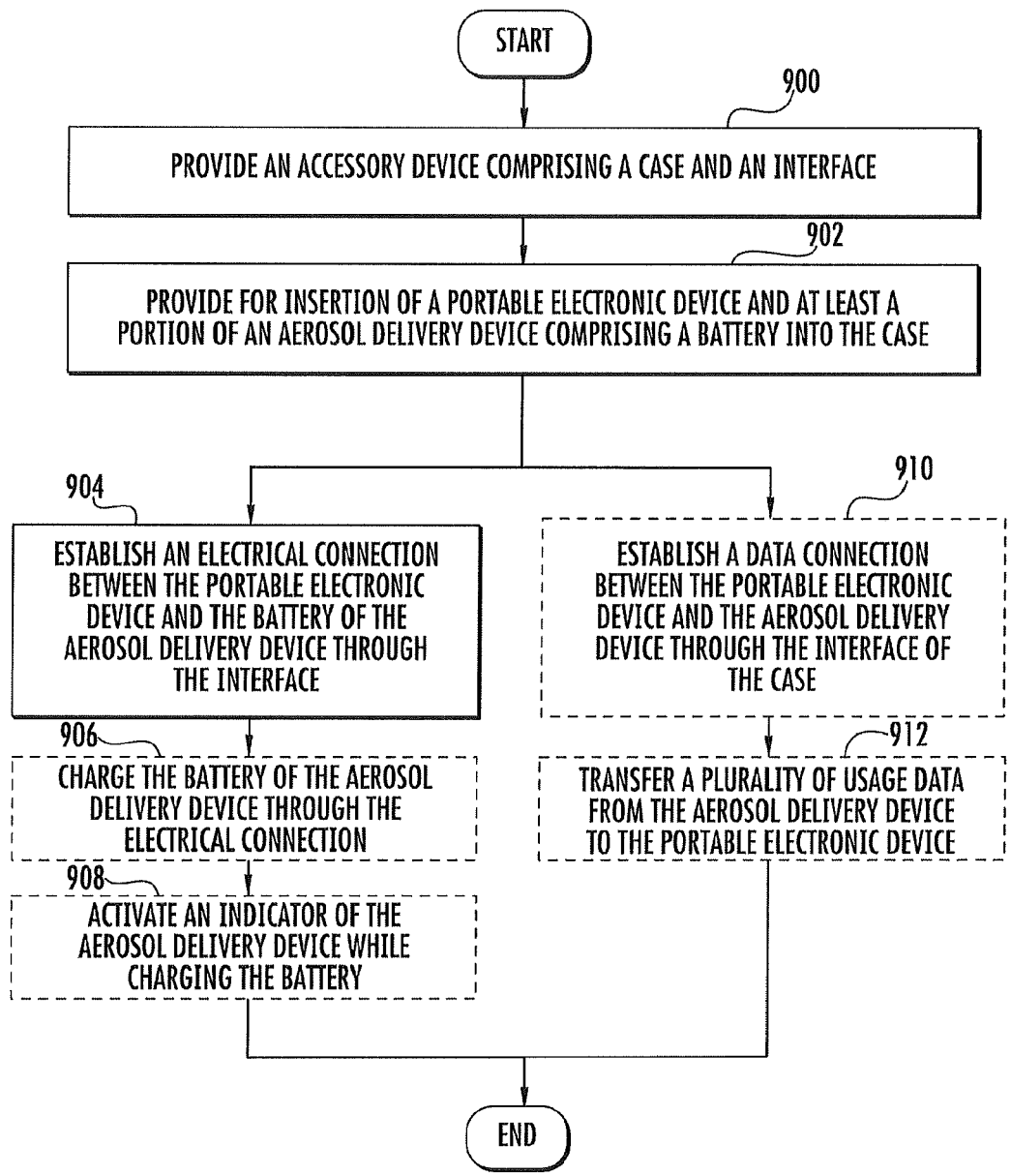

Having thus described the disclosure in the foregoing general terms, reference will now be made to the accompanying drawings, which are not necessarily drawn to scale, and wherein:

Figure 1:
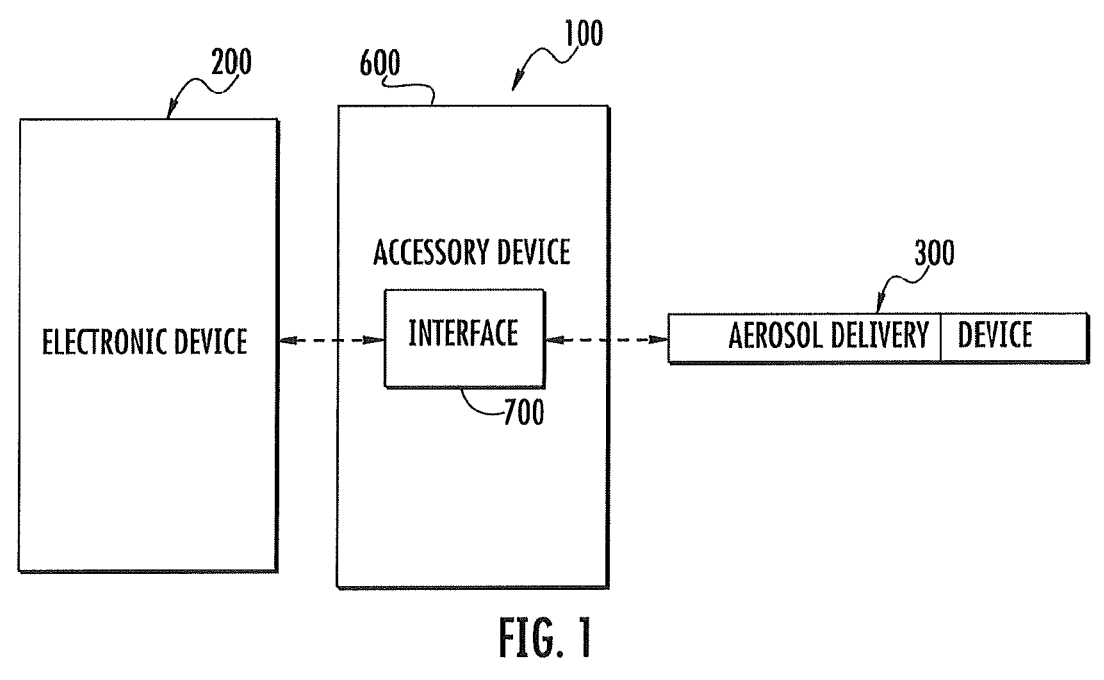

FIG. 1 a schematic view of a system including a portable electronic device, an aerosol delivery device, and an accessory device according to an example embodiment of the present disclosure;

FIG. 2 illustrates a schematic view of components of the portable electronic device of FIG. 1 according to an example embodiment of the present disclosure;

FIG. 3 illustrates a partially exploded view of the aerosol delivery device of FIG. 1 including a control body in an assembled configuration and a cartridge in an exploded configuration according to an example embodiment of the present disclosure;

FIG. 4 illustrates an exploded view of the control body of FIG. 3 according to an example embodiment of the present disclosure;

FIG. 5 illustrates a front perspective view of the accessory device of FIG. 1 including an interface and a case comprising a front cover and a rear cover according to an example embodiment of the present disclosure;

FIG. 6 illustrates a front perspective view of the front cover of the case of FIG. 5 according to an example embodiment of the present disclosure;

FIG. 7 illustrates a rear perspective view of the front cover of the case of FIG. 5 according to an example embodiment of the present disclosure;

FIG. 8 illustrates a front view of the front cover of the case of FIG. 5 according to an example embodiment of the present disclosure;

FIG. 9 illustrates an end view of the front cover of the case of FIG. 5 according to an example embodiment of the present disclosure;

FIG. 10 illustrates a rear perspective view of the rear cover of the case of FIG. 5 according to an example embodiment of the present disclosure;

FIG. 11 illustrates a front perspective view of the rear cover of the case of FIG. 5 according to an example embodiment of the present disclosure;

FIG. 12 illustrates a front view of the rear cover of the case of FIG. 5 according to an example embodiment of the present disclosure;

FIG. 13 illustrates an end view of the rear cover of the case of FIG. 5 according to an example embodiment of the present disclosure;

FIG. 14 illustrates a front perspective view of the rear cover and the interface of FIG. 5 according to an example embodiment of the present disclosure;

FIG. 15 illustrates a front perspective view of an assembly including the portable electronic device, the aerosol delivery device, and accessory device of FIG. 1 according to an example embodiment of the present disclosure;

FIG. 16 illustrates a partial perspective view of the assembly of FIG. 15 with the control body of the aerosol delivery device fully received in the accessory device according to an example embodiment of the present disclosure;

FIG. 17 illustrates a partial perspective view of the assembly of claim 15 with the control body of the aerosol delivery device partially received in the accessory device according to an example embodiment of the present disclosure; and FIG. 18 schematically illustrates a method for charging a battery of an aerosol delivery device according to an example embodiment of the present disclosure.

DETAILED DESCRIPTION OF PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

As schematically illustrated in FIG. 1, the present disclosure relates to an accessory device 100 usable with an electronic device 200 and an aerosol delivery device 300. As described hereinafter, the accessory device 100 may be configured to receive the electronic device 200 and the aerosol delivery device 300 therein. Further, the accessory device 100 may establish a connection (e.g., an electrical connection and/or a data connection) between the electronic device 200 and the aerosol delivery device 300.

FIG. 2 schematically illustrates components of the electronic device 200 according to an embodiment of the present disclosure. As illustrated, the electronic device 200 may include or otherwise be in communication with a power source 202, a processor 204, and a memory device 206. The power source 202 may be configured to provide electrical power to the electronic device 200. For example, the power source 202 may comprise a power inverter configured to convert alternating current to direct current. Alternatively or additionally, the power source 202 may comprise a battery or other device for storing and releasing electrical power.

The processor 204 may be embodied in a number of different forms. For example, the processor 204 may be embodied as one or more of various processing means such as a coprocessor, a microprocessor, a controller, a digital signal processor (DSP), processing circuitry, or various other processing devices including integrated circuits such as, for example, a special-purpose computer chip, or other hardware processor. In an example embodiment, the processor 204 may be configured to execute instructions stored in the memory device 206 or otherwise accessible to the processor. Alternatively or additionally, the processor 204 may be configured to execute hard coded functionality. As such, the processor 204 may be capable of performing operations according to embodiments of the present disclosure while configured accordingly. Alternatively, when the processor 204 is embodied as an executor of software instructions, the instructions may specifically configure the processor to perform the operations described herein. The processor 204 may include a clock, an arithmetic logic unit (ALU) and logic gates configured to support operation of the processor, amongst other components.

The memory device 206 may include non-transitory and tangible memory that may be, for example, volatile and/or non-volatile memory. The memory device 206 may be configured to store information, data, files, applications, instructions or the like. For example, the memory device 206 can be configured to buffer input data for processing by the processor 204. Additionally or alternatively, the memory device 206 can be configured to store instructions for execution by the processor 204.

Embodiments of the electronic device 200 may include additional components in some embodiments. In this regard, as illustrated in FIG. 2, the electronic device may further comprise a user interface 208 and/or a communication interface 210 in some embodiments. In some embodiments the electronic device 200 may include various additional or alternative components.

The user interface 208 may be in communication with the processor 204 to receive an indication of a user input at the user interface and/or to provide an audible/visible, mechanical (e.g., haptic) or other output to the user. As such, the user interface 208 may include, for example, a keyboard, a mouse, a joystick, a display/monitor, a touch screen (or other capacitive sensing component), a microphone, a speaker, a dial, accelerometers, gyroscopes, inertial sensors, and/or other input/output mechanisms. The processor 204 may be configured to control at least some functions of one or more elements of the user interface 208.

The communication interface 210 may be any means such as a device or circuitry embodied in either hardware, software, or a combination thereof that is configured to receive and/or transmit data. The communication interface 210 may be configured to receive and/or transmit data via a wired or wireless connection. In this regard, the communication interface 210 may include, for example, an antenna and supporting hardware and/or hardwired components and/or software. As illustrated, the communication interface 210 may allow the electronic device 200 to communicate with other devices 212, either directly, or via a network 214 (e.g., a local network or the internet).

Various embodiments of the electronic device 200 include, by way of example, a server, a personal digital assistant (PDA), a cellular telephone, a smartphone, a digital media player, a tablet computer, a laptop computer, a personal computer (PC), or various other embodiments of devices including at least a memory, a processor, and a power source, and optionally including other components as described above. In some embodiments the electronic device 200 may comprise a portable electronic device. A portable electronic device is an electronic device including a power source in the form of a battery or other component configured to provide power to the electronic device without requiring a hardwired connection to an electrical outlet at all times.

With respect to the aerosol delivery device 300, the embodiments disclosed herein are generally described in terms of so-called "e-cigarettes." However, it should be understood that the mechanisms, assemblies, components, features, apparatuses, computer program products, and methods disclosed herein may be embodied in many different forms and associated with a variety of other aerosol delivery devices. In this regard, embodiments of aerosol delivery devices according to the present disclosure may use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device may yield vapors (including vapors within aerosols that can be considered to be visible aerosols that might be considered to be described as smoke-like) resulting from volatilization or vaporization of certain components of the article or device. In highly preferred embodiments, aerosol delivery devices may incorporate tobacco and/or components derived from tobacco.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer body or shell. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary shell; or the elongated body can be formed of two or more separable pieces. For example, an aerosol delivery device can comprise an elongated shell or body that can be substantially tubular in shape and, as such, resemble the shape of a conventional cigarette or cigar. In one embodiment, all of the components of the aerosol delivery device are contained within one outer body or shell. Alternatively, an aerosol delivery device can comprise two or more shells that are joined and are separable. For example, an aerosol delivery device can possess at one end a control body comprising an outer body or shell containing one or more reusable components (e.g., a rechargeable battery and various electronics for controlling the operation of that article), and at the other end and removably attached thereto an outer body or shell containing a disposable portion (e.g., a disposable flavor-containing cartridge). More specific formats, configurations and arrangements of components within the single shell type of unit or within a multi-piece separable shell type of unit will be evident in light of the further disclosure provided herein. Additionally, various aerosol delivery device designs and component arrangements can be appreciated upon consideration of the commercially available electronic aerosol delivery devices, such as those representative products listed in the background art section of the present disclosure.

Aerosol delivery devices of the present disclosure most preferably comprise some combination of a power source (i.e., an electrical power source), at least one control component (e.g., means for actuating, controlling, regulating and ceasing power for heat generation, such as by controlling electrical current flow from the power source to other components of the article), a heater or heat generation component (e.g., an electrical resistance heating element or component commonly referred to as an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined air flow path through the article such that aerosol generated can be withdrawn therefrom upon draw). Exemplary formulations for aerosol precursor materials that may be used according to the present disclosure are described in U.S. Pat. Pub. No. 2013/0008457 to Zheng et al., the disclosure of which is incorporated herein by reference in its entirety.

Alignment of the components within the aerosol delivery device can vary. In specific embodiments, the aerosol precursor composition can be located near an end of the article (e.g., within a cartridge, which in certain circumstances can be replaceable and disposable), which may be configured to be positioned proximal to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (as well as one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof. Additionally, the selection of various aerosol delivery device components can be appreciated upon consideration of the commercially available electronic aerosol delivery devices, such as those representative products listed in the background art section of the present disclosure.

An aerosol delivery device incorporates a battery or other electrical power source to provide current flow sufficient to provide various functionalities to the article, such as resistive heating, heating of solid state components, powering of control systems, powering of indicators, and the like. The power source can take on various embodiments. Preferably, the power source is able to deliver sufficient power to rapidly heat the heating element to provide for aerosol formation and power the article through use for the desired duration of time. The power source preferably is sized to fit conveniently within the aerosol delivery device so that the aerosol delivery device can be easily handled; and additionally, a preferred power source is of a sufficiently light weight to not detract from a desirable smoking experience.

One example embodiment of the aerosol delivery device 300 is illustrated in FIG. 3. In particular, FIG. 3 illustrates a partially exploded view of an aerosol delivery device 300 including a cartridge 400 and a control body 500. The cartridge 400 and the control body 500 can be permanently or detachably aligned in a functioning relationship. Various embodiments of engagement between the cartridge 400 and the control body 500 may be employed such as a threaded engagement, a press-fit engagement, an interference fit, a magnetic engagement, or the like. The aerosol delivery device 300 may be substantially rod-like, substantially tubular shaped, or substantially cylindrically shaped in some embodiments when the cartridge 400 and the control body 500 are in an assembled configuration.

In specific embodiments, one or both of the cartridge 400 and the control body 500 may be referred to as being disposable or as being reusable. For example, the control body 500 may have a replaceable battery or a rechargeable battery and thus may be combined with any type of recharging technology, including connection to a typical alternating current electrical outlet, connection to a car charger (i.e., cigarette lighter receptacle), and connection to a computer, such as through a universal serial bus (USB) cable. Further, in some embodiments the cartridge 400 may comprise a single-use cartridge, as disclosed in U.S. patent application Ser. No. 13/603,612, filed Sep. 5, 2012, which is incorporated herein by reference in its entirety.

The control body 500 is illustrated in an assembled configuration. Details with respect to the components and functionality of the control component 500 are provided below. Briefly, however, the control body 500 may comprise a coupler 502 and an outer body 504.

The cartridge 400 is illustrated in an exploded configuration in FIG. 3. As illustrated, the cartridge 400 may comprise a base shipping plug 402, a base 404, a control component terminal 406, an electronic control component 408, a flow tube 410, an atomizer 412, a reservoir substrate 414, an outer body 416, a label 418, a mouthpiece 420, and a mouthpiece shipping plug 422 according to an example embodiment of the present disclosure. The base 404 may be coupled to a first end of the outer body 416 and the mouthpiece 420 may be coupled to an opposing second end of the outer body to enclose the remaining components of the cartridge 400 therein. The base 404 may be configured to engage the coupler 502 of the control body 500. In some embodiments the base 404 may comprise anti-rotation features that substantially prevent relative rotation between the cartridge and the control body as disclosed in U.S. patent application Ser. No. 13/840,264, filed Mar. 15, 2013, which is incorporated herein by reference in its entirety.

The base shipping plug 402 may be configured to engage and protect the base 404 prior to use of the cartridge 400. Similarly, the mouthpiece shipping plug 422 may be configured to engage and protect the mouthpiece 420 prior to use of the cartridge 400. The control component terminal 406, the electronic control component 408, the flow tube 410, the atomizer 412, and the reservoir substrate 414 may be retained within the outer body 416. The label 418 may at least partially surround the outer body 416 and include information such as a product identifier thereon.

The atomizer 412 may comprise a first heater terminal 434a and a second heater terminal 434b, a liquid transport element 438 and a heating element 440. In this regard, the reservoir substrate 414 may be configured to hold an aerosol precursor composition. The aerosol precursor composition, also referred to as a vapor precursor composition, may comprise a variety of components including, by way of example, a polyhydric alcohol (e.g., glycerin, propylene glycol, or a mixture thereof), nicotine, tobacco, tobacco extract, and/or flavorants. Various components that may be included in the aerosol precursor composition are described in U.S. Pat. No. 7,726,320 to Robinson et al., which is incorporated herein by reference in its entirety. Additional representative types of aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference in their entireties.

The reservoir substrate 414 may comprise a plurality of layers of nonwoven fibers formed into the shape of a tube encircling the interior of the outer body 416 of the cartridge 400. Thus, liquid components, for example, can be sorptively retained by the reservoir substrate 414. The reservoir substrate 414 is in fluid connection with the liquid transport element 438. Thus, the liquid transport element 438 may be configured to transport liquid from the reservoir substrate 414 to the heating element 440 via capillary action. Suitable embodiments of a reservoir substrate are described, for example, in U.S. patent application Ser. No. 13/802,950, filed Mar. 13, 2013, which is incorporated herein by reference in its entirety.

As illustrated, the liquid transport element 438 may be in direct contact with the heating element 440. As illustrated, the heating element 440 may comprise a wire defining a plurality of coils wound about the liquid transport element 438. In some embodiments the heating element 440 may be formed by winding the wire about the liquid transport element 438 as described in U.S. patent application Ser. No. 13/708,381, filed Dec. 7, 2012, which is incorporated herein by reference in its entirety. Further, in some embodiments the wire may define a variable coil spacing, as described in U.S. patent application Ser. No. 13/827,994, filed Mar. 14, 2013, which is incorporated herein by reference in its entirety. Various embodiments of materials configured to produce heat when electrical current is applied therethrough may be employed to form the heating element 440. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), and ceramic (e.g., a positive temperature coefficient ceramic).

However, various other embodiments of methods may be employed to form the heating element 440, and various other embodiments of heating elements may be employed in the atomizer 412. For example, a stamped heating element may be employed in the atomizer, as described in U.S. patent application Ser. No. 13/842,125, filed Mar. 15, 2013, which is incorporated herein by reference in its entirety. Further to the above, additional representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties.

The first heater terminal 434a and the second heater terminal 434b (e.g., positive and negative terminals) at the opposing ends of the heating element 440 are configured to form an electrical connection with the control body 500 when the cartridge 400 is connected thereto. Further, when the control body 500 is coupled to the cartridge, the electronic control component 408 may form an electrical connection with the control body through the control component terminal 406. The control body 500 may thus employ the electronic control component 408 to determine whether the cartridge 400 is genuine and/or perform other functions. Further, various examples of electronic control components and functions performed thereby are described in U.S. patent application Ser. No. 13/647,000, filed Oct. 8, 2012, which is incorporated herein by reference in its entirety.

During use, a user may draw on the mouthpiece 420 of the cartridge 400 of the aerosol delivery device 300. This may pull air through an opening in the control body 500 or in the cartridge. For example, in one embodiment an opening may be defined between the coupler 502 and the outer body 504 of the control body 500, as described in U.S. patent application Ser. No. 13/841,233; Filed Mar. 15, 2013, which is incorporated herein by reference in its entirety. However, the flow of air may be received through other parts of the aerosol delivery device 300 in other embodiments. As noted above, in some embodiments the cartridge 400 may include the flow tube 410. The flow tube 410 may be configured to direct the flow of air received from the control body 500 to the heating element 440 of the atomizer 412.

A sensor in the aerosol delivery device 300 (e.g., a puff or flow sensor in the control body 500) may sense the puff. When the puff is sensed, the control body 500 may direct current to the heating element 440 through a circuit including the first heater terminal 434a and the second heater terminal 434b. Accordingly, the heating element 440 may vaporize the aerosol precursor composition directed to an aerosolization zone from the reservoir substrate 414 by the liquid transport element 438. Thus, the mouthpiece 420 may allow passage of air and entrained vapor (i.e., the components of the aerosol precursor composition in an inhalable form) from the cartridge 400 to a consumer drawing thereon.

Various other details with respect to the components that may be included in the cartridge 400, are provided, for example, in U.S. patent application Ser. No. 13/840,264, filed Mar. 15, 2013, which is incorporated herein by reference in its entirety. In this regard, FIG. 7 thereof illustrates an enlarged exploded view of a base and a control component terminal; FIG. 8 thereof illustrates an enlarged perspective view of the base and the control component terminal in an assembled configuration; FIG. 9 thereof illustrates an enlarged perspective view of the base, the control component terminal, an electronic control component, and heater terminals of an atomizer in an assembled configuration; FIG. 10 thereof illustrates an enlarged perspective view of the base, the atomizer, and the control component in an assembled configuration; FIG. 11 thereof illustrates an opposing perspective view of the assembly of FIG. 10 thereof; FIG. 12 thereof illustrates an enlarged perspective view of the base, the atomizer, the flow tube, and the reservoir substrate in an assembled configuration; FIG. 13 thereof illustrates a perspective view of the base and an outer body in an assembled configuration; FIG. 14 thereof illustrates a perspective view of a cartridge in an assembled configuration; FIG. 15 thereof illustrates a first partial perspective view of the cartridge of FIG. 14 thereof and a coupler for a control body; FIG. 16 thereof illustrates an opposing second partial perspective view of the cartridge of FIG. 14 thereof and the coupler of FIG. 11 thereof; FIG. 17 thereof illustrates a perspective view of a cartridge including a base with an anti-rotation mechanism; FIG. 18 thereof illustrates a perspective view of a control body including a coupler with an anti-rotation mechanism; FIG. 19 thereof illustrates alignment of the cartridge of FIG. 17 with the control body of FIG. 18; FIG. 3 thereof illustrates an aerosol delivery device comprising the cartridge of FIG. 17 thereof and the control body of FIG. 18 thereof with a modified view through the aerosol delivery device illustrating the engagement of the anti-rotation mechanism of the cartridge with the anti-rotation mechanism of the connector body; FIG. 4 thereof illustrates a perspective view of a base with an anti-rotation mechanism; FIG. 5 thereof illustrates a perspective view of a coupler with an anti-rotation mechanism; and FIG. 6 thereof illustrates a sectional view through the base of FIG. 4 thereof and the coupler of FIG. 5 thereof in an engaged configuration.

The various components of an aerosol delivery device according to the present disclosure can be chosen from components described in the art and commercially available. Reference is made for example to the reservoir and heater system for controllable delivery of multiple aerosolizable materials in an electronic smoking article disclosed in U.S. patent application Ser. No. 13/536,438, filed Jun. 28, 2012, which is incorporated herein by reference in its entirety. Further, U.S. patent application Ser. No. 13/602,871, filed Sep. 4, 2012, discloses an electronic smoking article including a microheater, and which is incorporated herein by reference in its entirety.

Note further that portions of the cartridge 400 illustrated in FIG. 3 are optional. In this regard, by way of example, the cartridge 400 may not include the flow tube 410, the control component terminal 406, and/or the electronic control component 408 in some embodiments.

In another embodiment substantially the entirety of the cartridge may be formed from one or more carbon materials, which may provide advantages in terms of biodegradability and absence of wires. In this regard, the heating element may comprise a carbon foam, the reservoir may comprise carbonized fabric, and graphite may be employed to form an electrical connection with the battery and controller. An example embodiment of a carbon-based cartridge is provided in U.S. patent application Ser. No. 13/432,406; filed Mar. 28, 2012, which is incorporated herein by reference in its entirety.

FIG. 4 illustrates an exploded view the control body 500 of the aerosol delivery device 300 of FIG. 3 according to an example embodiment of the present disclosure. As illustrated, the control body 500 may comprise the coupler 502, the outer body 504, a sealing member 506, an adhesive member 508 (e.g., KAPTON® tape), a flow sensor 510, a control component 512, a spacer 514, an electrical power source 516 (e.g., a battery, which may be rechargeable), a circuit board with an indicator 518, a connector circuit 520, and an end cap 522. Examples of electrical power sources are described in U.S. Pat. App. Pub. No. 2010/0028766 by Peckerar et al., the disclosure of which is incorporated herein by reference in its entirety. An exemplary mechanism that can provide puff-actuation capability includes a Model 163PC01D36 silicon sensor, manufactured by the Micro-Switch division of Honeywell, Inc., Freeport, Ill. Further examples of demand-operated electrical switches that may be employed in a heating circuit according to the present disclosure are described in U.S. Pat. No. 4,735,217 to Gerth et al., which is incorporated herein by reference in its entirety. Further description of current regulating circuits and other control components, including microcontrollers that can be useful in the present aerosol delivery device, are provided in U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., and U.S. Pat. No. 7,040,314 to Nguyen et al., all of which are incorporated herein by reference in their entireties. Reference also is made to the control schemes described in U.S. application Ser. No. 13/837,542, filed Mar. 15, 2013, which is incorporated herein by reference in its entirety.

As noted above, the coupler 502 may be configured to couple to the cartridge 400. The coupler 502 may include a plurality of control body terminals 524 extending therefrom which may extend through the sealing member 506 and engage one or both of the control component 512 and the electrical power source 516. The control component 512 may be a printed circuit board including a microcontroller. The flow sensor 510 may be coupled to the control component 512 or may be a separate element.

In one embodiment the indicator 518 may comprise one or more light emitting diodes. The indicator 518 can be in communication with the control component 512 through the connector circuit 520 and illuminate, for example, during a user drawing on a cartridge (e.g., cartridge 400) coupled to the coupler 502, as detected by the flow sensor 510. The end cap 522 may be adapted to make visible the illumination provided thereunder by the indicator 518. Accordingly, the indicator 518 may illuminate during use of the aerosol delivery device 300 to simulate the lit end of a smoking article. However, in other embodiments the indicator 518 can be provided in varying numbers and can take on different shapes and can even be an opening in the outer body (such as for release of sound when such indicators are present).

Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. App. Pub. No. 2010/0163063 by Fernando et al. discloses identification systems for smoking devices; and WO 2010/003480 by Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. App. Pub. Nos. 2006/0196518 and 2009/0188490 to Hon; U.S. Pat. App. Pub. No. 2009/0272379 to Thorens et al.; U.S. Pat. App. Pub. Nos. 2009/0260641 and 2009/0260642 to Monsees et al.; U.S. Pat. App. Pub. Nos. 2008/0149118 and 2010/0024834 to Oglesby et al.; U.S. Pat. App. Pub. No. 2010/0307518 to Wang; WO 2010/091593 to Hon; WO 2013/089551 to Foo; and U.S. patent application Ser. No. 13/841,233, filed Mar. 15, 2013, each of which is incorporated herein by reference in its entirety. A variety of the materials disclosed by the foregoing documents may be incorporated into the present devices in various embodiments, and all of the foregoing disclosures are incorporated herein by reference in their entireties.

As briefly noted above, the accessory device 100 may be configured to receive the electronic device 200 and the aerosol delivery device 300 therein and establish a connection (e.g., an electrical connection and/or a data connection) therebetween. In this regard, as schematically illustrated in FIG. 1, the accessory device 100 may include a body or case 600 and an interface 700, which may be received therein.

An example embodiment of the accessory device 100 is illustrated in FIG. 5. More particularly, FIG. 5 illustrates a front perspective view of the accessory device 100. As illustrated, the case 600 of the accessory device 100 may comprise a front cover 602 and a rear cover 604. The front cover 602 and the rear cover 604 may be configured to lock together in a closed configuration, as illustrated in FIG. 5. For clarity purposes, a portable electronic device is not illustrated as being received in the case 600 in FIG. 5.

FIGS. 6-9 illustrate the front cover 602 separate from the remainder of the case 600. More particularly, FIG. 6 illustrates a front (outer) perspective view of the front cover 602, FIG. 7 illustrates a rear (inner) perspective view of the front cover, FIG. 8 illustrates a front (outer) view of the front cover, and FIG. 9 illustrates an end view of the front cover. As illustrated, the front cover 602 may define a substantially planar major wall 606 with a display opening 608 extending therethrough. A lip 610 may extend from the major wall 606. As illustrated, the lip 610 may extend substantially perpendicularly to the major wall 606. The lip 610 may at least partially surround the display opening 608. In this regard, the lip 610 may define first and second longitudinally extending walls 610a,b and first and second laterally extending walls 610c,d. (discuss 610a in the figures) As illustrated, the walls 610a-d of the lip 610 may include one or more cutouts therein, as discussed below.

The major wall 606 may extend past the first longitudinally extending wall 610a of the lip 610 and terminate at an outer lip 612. The outer lip 612 may extend substantially perpendicularly to the major wall 606 and along a longitudinal length (e.g., the major length) of the front cover 602. The first longitudinally extending wall 610a of the lip 610 may divide the front cover 602 into a portable electronic device portion 614 and an aerosol delivery device portion 616. More particularly, the portable electronic device portion 614 may include portions of the front cover 602 between the first and second longitudinally extending walls 610a,b of the lip 610. Conversely, the aerosol delivery device portion 616 may include portions of the front cover 602 between the first longitudinally extending wall 610a and the outer lip 612. As described below, the portable electronic device portion 614 of the front cover 602 may be configured to receive a portable electronic device and the aerosol delivery device portion 616 of the front cover may be configured to receive an aerosol delivery device. In this regard, in some embodiments the first longitudinally extending wall 610a and the outer lip 612 may collectively define a partial cylindrical configuration, as illustrated.

Note that in the embodiment described above and illustrated in the drawings, the aerosol delivery device portion 616 extends along a longitudinal length (e.g., the major length) of the front cover 602. The aerosol delivery device portion may alternatively extend along an opposing longitudinal length of the front cover. Configurations in which the aerosol delivery device portion extends along a longitudinal length of the front cover may be preferable because they do not block access to longitudinal ends of the portable electronic device portion, at which various connectors, outputs, buttons, and/or other components of a portable electronic device may be positioned when a portable electronic device is received therein. However, in another embodiment the aerosol delivery device portion may extend along a lateral length (e.g., the minor length) of the front cover.

A plurality of cutouts may extend through the lip 610. In particular, an interface cutout 618 (see, FIG. 7) may extend through the first longitudinally extending wall 610a of the lip 610. Accordingly, the interface cutout 618 may extend between the portable electronic device portion 614 and the aerosol delivery device portion 616 of the front cover 602 and allow an interface to extend therebetween.

Further, a connector cutout 620 may be defined through the first laterally extending wall 610*c* of the lip 610. Additional cutouts may include first and second audio output cutouts 622 defined through the first laterally extending wall 610*c* of the lip 610 on opposing sides of the connector cutout 620. Additionally, a side button cutout 624 may be defined through the second longitudinally extending wall 610*b* of the lip 610 and a top button cutout 626 may be defined through the second laterally extending wall 610*d* of the lip. Note, however, that the particular location and purpose of the cutouts may depend on the portable electronic device which the case 600 is configured to receive. In this regard, the location of the cutouts in the lip 610 may depend on the location of any buttons, speakers, audio jacks, connectors, etc. at the perimeter of the portable electronic device.

FIGS. 10-13 illustrate the rear cover 604 separate from the remainder of the case 600. More particularly, FIG. 10 illustrates a rear (outer) perspective view of the rear cover 604, FIG. 11 illustrates a front (inner) perspective view of the rear cover, FIG. 12 illustrates a front (inner) view of the rear cover, and FIG. 13 illustrates an end view of the rear cover. The rear cover 604 may define a substantially planar major wall 628. In some embodiments the major wall 628 may include a camera aperture 630 extending therethrough in embodiments in which the case 600 is configured to receive a portable electronic device including a camera. The camera aperture 630 may be positioned at a variety of locations in the major wall 628. A lip 632 may extend from the major wall 628 substantially perpendicularly thereto. The lip 632 may extend around at least a portion of the perimeter of the major wall 628. In this regard, the lip 632 may define first and second longitudinally extending walls 632*a,b* and first and second laterally extending walls 632*c,d*. As illustrated, the walls 632*a-d* of the lip 632 may include one or more cutouts therein, as discussed below.

The major wall 628 may extend past the first longitudinally extending wall 632*a* of the lip 632 and terminate at an outer lip 633. The outer lip 633 may extend substantially perpendicularly to the major wall 628 and along a longitudinal length (e.g., the major length) of the rear cover 604. The first longitudinally extending wall 632*a* of the lip 632 may divide the rear cover 604 into a portable electronic device portion 634 and an aerosol delivery device portion 636. More particularly, the portable electronic device portion 634 may include portions of the rear cover 604 between the first and second longitudinally extending walls 632*a,b* of the lip 632. Conversely, the aerosol delivery device portion 636 may include portions of the rear cover 604 between the first longitudinally extending wall 632*a* and the outer lip 633. As described below, the portable electronic device portion 634 of the rear cover 604 may be configured to receive a portable electronic device and the aerosol delivery device portion 636 of the rear cover may be configured to receive an aerosol delivery device. In this regard, in some embodiments the first longitudinally extending wall 632*a* and the outer lip 633 may collectively define a partial cylindrical configuration, as illustrated.

Note that in the embodiment described above and illustrated in the drawings, the aerosol delivery device portion 636 extends along a longitudinal length (e.g., the major length) of the rear cover 604. This configuration may be preferable because it does not block access to longitudinal ends of the portable electronic device portion 634, at which various connectors, outputs, buttons, and/or other components of a portable electronic device may be positioned when a portable electronic device is received therein. However, in another embodiment the aerosol delivery device portion may extend along an opposite longitudinal length or a lateral length (e.g., the minor length) of the rear cover.

A plurality of cutouts may extend through the lip 632. In particular, an interface cutout 638 may extend through the first longitudinally extending wall 632*a* of the lip 632. Accordingly, the interface cutout 638 may extend between the portable electronic device portion 634 and the aerosol delivery device portion 636 of the rear cover 604 and, as described below, allow an interface to extend therebetween.

Further, a connector cutout 640 may be defined through the first laterally extending wall 632*c* of the lip 632. Additional cutouts may include first and second audio output cutouts 642 defined through the first laterally extending wall 632*c* of the lip 632 on opposing sides of the connector cutout 640. Further, a side button cutout 644 may be defined through the second longitudinally extending wall 632*b* of the lip 632 and a top button cutout 646 may be defined through the second laterally extending wall 632*d* of the lip. Note, however, that the particular location and purpose of the cutouts may depend on the portable electronic device which the case 600 is configured to receive. In this regard, the location of the cutouts in the lip 632 may depend on the location of any buttons, speakers, audio jacks, connectors, etc. at the perimeter of the portable electronic device.

The rear cover 604 may additionally include one or more spacers 648 that extend from the major wall 628 within the portable electronic device portion 634. The spacers 648 may be configured to space a portable electronic device away from the major wall 628 of the rear cover 604. In this regard, a gap formed between the portable electronic device and the major wall 628 of the rear cover 604 may allow for cooling of the portable electronic device. In contrast, direct contact between the major wall 628 and a substantially planar surface of the portable electronic device may insulate the portable electronic device, which may adversely impact the performance of the portable electronic device. Further, in some embodiments the spacers 648 may comprise an elastomeric material (e.g., rubber) configured to reduce shock applied to the portable electronic device during a drop event or other impact. In this regard, the entirety of the case 600 may comprise an elastomeric material, or portions of the case such as the spacers 648 may comprise elastomeric components that are glued or otherwise coupled to the major wall 628. Other exemplary shock reduction materials useful as spacers 648 include solid foams.

The spacers 648 may extend generally longitudinally along the length of the rear cover 604. Thereby, a portable electronic device may be supported substantially along the entirety of the length thereof. As further illustrated, one of the spacers 648*a* may surround the camera aperture 630 to seal against the portable electronic device and resist fluid ingress. Other positionings and spacings of the spacers are also encompassed.

FIG. 14 illustrates an embodiment of the interface 700 coupled to the rear cover 604. However, it should be understood that the interface 700 may be coupled to the case 600 in a variety of other positions and manners in other embodiments. As noted above, the interface 700 may be configured to establish a connection between a portable electronic device and an aerosol delivery device. In this regard, the interface 700 may include a connector 702 configured to connect to a portable electronic device, a connector 704 configured to connect to an aerosol delivery device, and a circuit 706 extending therebetween.

Returning to FIG. 5, as illustrated the front cover 602 and the rear cover 604 of the case 600 may cooperate to define a first cavity 650 configured to receive a portable electronic device and a second cavity 652 configured to receive at least a portion of an aerosol delivery device comprising a battery. In this regard, in some embodiments the second cavity 652 may be configured to receive a control body of the aerosol delivery. Further, in some embodiments the front cover 602 and the rear cover 604 of the case 600 may cooperate to further define a third cavity 654, which may be separated from the second cavity 652 by the connector 704. The third cavity 654 may be configured to receive a cartridge of the aerosol delivery device. The second cavity 652 may define an opening 656 at a longitudinal end of the case 600 and the third cavity 654 may define an opening 658 at an opposing second longitudinal end of the case.

When the case 600 is in the closed configuration (see, e.g., FIG. 5), the lip 610 of the front cover 602 may engage the lip 632 of the rear cover 604. Further, the outer lip 612 of the front cover 602 may engage the outer lip 633 of the rear cover 604 when the case 600 is in the closed configuration. Interference fit between the front cover 602 and the rear cover 604 or other retaining mechanisms or means (e.g., magnets) may be employed to releasably lock the front cover to the rear cover directly or through engagement with a portable electronic device received therein.

Further, the top button cutout 626 of the front cover 602 may cooperate with the top button cutout 646 of the rear cover 604 to define a top button opening 660. Further, the audio output cutouts 622 of the front cover 602 may cooperate with the audio output cutouts 642 of the rear cover 604 to define one or more audio output openings 662. Additionally, the connector cutout 620 of the front cover 602 may cooperate with the connector cutout 640 of the rear cover 604 to define a connector opening 664. Also, the side button cutout 624 of the front cover 602 may cooperate with the side button cutout 644 of the rear cover 604 to define a side button opening 666.

FIGS. 15 and 16 illustrate an embodiment of an assembly 800 comprising the accessory device 100, the portable electronic device 200, and the cartridge 400 and the control body 500 of the aerosol delivery device 300. As illustrated, the portable electronic device 200 may be received in the first cavity 650 defined by the case 600 of the accessory device 100. The case 600 may be configured such that various user interface mechanisms of the portable electronic device 200 are accessible when received therein.

For example, as illustrated in FIG. 15, a touchscreen 208a of the portable electronic device 200 may be accessible through the display opening 608 in the case 600, one or more volume buttons 208b and/or or a locking switch 208c may be accessible through the side button opening 666 in the case, and one or more speakers 208d and/or an audio jack 208e may be accessible through the audio output openings 662 in the case. Further, as illustrated in FIG. 16, a power button 208e may be accessible through the power button opening 660 in the case 600. Note, as mentioned above, that the particular embodiments of openings in the case may be selected based on the particular configuration of the portable electronic device. Accordingly, in some embodiments substantially all of the functionality of the portable electronic device may be retained while the portable electronic device is received in the case, regardless of the particular configuration of the portable electronic device. In this regard, for example, the second and third cavities 652, 654 may be disposed on a side of the case corresponding to a location at which the portable electronic device is substantially devoid of buttons or other user interface mechanisms.

Further, when the portable electronic device 200 is received in the case 600, the portable electronic device may connect to the connector 702 of the interface 700. In this regard, for example, the connector 702 may slide into engagement with a power and/or data port of the portable electronic device 200 during engagement with the rear cover 604 of the case 600, and thereafter the front cover 602 may be engaged with the portable electronic device and the rear cover.

As illustrated in FIG. 5, a first end 702a of the connector 702 may be configured to insert into the portable electronic device 200 as described above. Further, in some embodiments a second end 702b of the connector 702 may optionally be configured to receive an external power and/or data cable. In this regard, in some embodiments the connector 702 may comprise a pass-through connector. Thereby, the connector 702 may allow for data and/or power transmission through the connector 702 in substantially the same manner as may occur through direct connection to the portable electronic device 200. Thus, for example, the portable electronic device 200 may be charged and/or establish a data connection through the connector 702 with an external device while received in the accessory device 100. Accordingly, the interface 702 may be configured to allow for connection of an additional accessory device (e.g., through a power cord or a data cable) to the portable electronic device 200 while the portable electronic device is received in the case 600.

As further illustrated in FIGS. 15 and 16 the aerosol delivery device 300 may also be received in the case 600. More particularly, the control body 500 may be received in the second cavity 652 and the cartridge 400 may optionally be received in the third cavity 654. As illustrated in FIGS. 15 and 16, the front cover 602 and the rear cover 604 of the case may be configured to lock together in the closed configuration to retain the portable electronic device 200 in the first cavity 650. However, when the case 600 is in the closed configuration, the case may allow for insertion and removal of the aerosol delivery device 300. In this regard, the openings 656, 658 to the second and third cavities 652, 654 may remain open when the case 600 is in the closed configuration such the aerosol delivery device 300 may be releasably retained in the case. For example, in some embodiments the case 600 may frictionally engage the control body 500 and the cartridge 400 when respectively received in the second and third cavities 652, 654 such that the aerosol delivery device is releasably retained therein.

In some embodiments the connector 704 may releasably engage one or both of the control body 500 and the cartridge 400. For example, the connector 704 may be configured to engage one or both of the coupler 502 of the control body 500 and the base 404 of the cartridge 400. By way of further example, as illustrated in FIG. 5, a first end 704a of the connector 704 may be configured to engage the coupler 502 of the control body 500 and a second end 704b of the connector may be configured to engage the base 404 of the cartridge 400. In this regard, the first end 704a of the connector 704 may be shaped substantially similarly to the base 404 of the cartridge 400 and the second end 704b of the connector may be shaped substantially similarly to the coupler 502 of the control body 500. In this manner, the connector 704 may engage the control body 500 and/or the cartridge 400 in substantially the same manner that the cartridge engages the control body.

Further, in some embodiments the connector 704 may include a spring-loaded locking mechanism. The spring-loaded locking mechanism may be configured such that when the control body 500 is inserted into the second cavity 652, a spring of the spring-loaded locking mechanism is compressed. The spring-loaded locking mechanism may be configured such that as the control body 500 is inserted into the second cavity 652, the control body extends inwardly past a neutral position (see, FIG. 16) and then the spring pushes the control body slightly outwardly to the neutral position as the user stops pressing inwardly and retracts his or her finger. In order to remove the control body 500 from the second cavity 652, he or she may push inwardly on the control body, which may release the control body and push it outwardly to an intermediate position (see, FIG. 17), from which the control body may be grasped and removed. The connector 704 may additionally or alternatively comprise a spring-loaded locking mechanism configured to perform in substantially the same manner with respect to the cartridge 400 when inserted into the third cavity 654 in some embodiments.

When the portable electronic device 200 and the aerosol delivery device 300 are received in the case 600, the interface 700 may establish an electrical connection between the aerosol delivery device and the portable electronic device. For example, the interface 700 may provide an electrical connection between a battery of the aerosol delivery device 300 (e.g., the electrical power source 516 of the control body 500) and the portable electronic device 200. Further, in some embodiments the interface may be configured to establish a data connection between the portable electronic device 200 and the aerosol delivery device 300, which may provide additional functionality as describe below.

Accordingly, in some embodiments power from the portable electronic device 200 may be employed to charge the aerosol delivery device 300, or vice versa. For example, such power may be provided by the power source 202 of the portable electronic device 200. As noted above, the power source 202 may comprise a battery and/or a power inverter configured to convert alternating current to direct current. Thus, in some embodiments the power source 202 of the portable electronic device 200 may charge the aerosol delivery device 300 regardless of whether the portable electronic device is plugged in to an external power source at the time.

The aerosol delivery device 300 may be configured such that when the electrical power source 516 is being charged, the indicator 518 blinks or otherwise illuminates. For example, the indicator 518 may blink a red color during charging, and then cease blinking when charging is complete, blink a different color, or display a constant light. The case 600 may be configured such that the indicator 518 on the control body 500 is visible when the control body is received in the second cavity 652. In this regard, the opening 656 to the second cavity 652 may be configured such that at least a portion of the indicator 518 extends outside of the opening. For example, as illustrated in FIG. 16, the opening 656 to the second cavity 652 may define a recessed portion 656*a* that allows for viewing of the indicator.

Thus, as described above, the interface 700 may be configured to cause the portable electronic device 200 to charge a battery of the aerosol delivery device 300. Certain control logic may be employed to control the charging process. Such control logic may be stored in memory in the aerosol delivery device 300 or memory of the interface 700 and transmitted to the portable electronic device 200 through the interface in some embodiments. Alternatively, the portable electronic device 200 may download the control logic from an external source. For example, an application may be made available for download to the portable electronic device.

Accordingly, the portable electronic device 200 may acquire and store program code instructions (e.g., in the memory device 206) that may provide a variety of functionality. For example, the program code instructions may provide for charging a battery (e.g., electrical power source 516) of the aerosol delivery device 300 through an electrical connection established between the portable electronic device 200 and the aerosol delivery device. In this regard, the program code instructions may be configured to control the output of power from the portable electronic device 200 to the aerosol delivery device 300. For example, the program code instructions may determine a charge level of the battery of the aerosol delivery device 300 and output power to the aerosol delivery device based thereon. Accordingly, for example, the portable electronic device 200 may stop charging the battery of the aerosol delivery device when the battery reaches a desired level of charge.

In some embodiments the computer program instructions may prevent the portable electronic device 200 from charging the battery of the aerosol delivery device 300 in certain circumstances. For example, in instances in which a battery of the portable electronic device 200 defines a power level below a threshold value, the program code instructions may prevent the portable electronic device from charging the battery of the aerosol delivery device 300 or alert the user of the power level of the portable electronic device and seek user input with respect to whether or not to proceed with charging. Thus, issues with respect to inadvertently draining a battery of the portable electronic device 200 below a desired extent may be avoided.

Additional program code instructions may be configured to provide other functionality. For example, program code instructions may be configured to activate the indicator 518 of the aerosol delivery device 300 while charging the battery as described above. Further, program code instructions may be configured to establish a data connection between the portable electronic device 200 and the aerosol delivery device 300. Thereby, for example, usage data may be transferred from the aerosol delivery device 300 to the portable electronic device 200. Accordingly, a user may employ the portable electronic device 200 to track his or her usage of the aerosol delivery device 300. Further, program code instructions may be employed to indicate to a user a remaining capacity of the cartridge 400 of the aerosol delivery device 300. Additionally, program code instructions may be configured to transfer a software update to the aerosol delivery device 300. Accordingly, software on the aerosol delivery device 300 may be updated to a most current version.

Additional functionality may be provided by the program code instructions. For example, usage data may be uploaded to a social media site for sharing and exchanging information with others. Further, location data acquired by the portable electronic device 200 (e.g., using a global positioning system) may be employed to locate other users of aerosol delivery devices, or such location information may be employed to provide a user with the location of retailers that sell aerosol delivery device products near the user's present location. Additional program code instructions may be employed to provide diagnostic functionality in the event that the aerosol delivery device 300 is operating improperly. Further program code instructions may allow for customization of the operation of the aerosol delivery device using the portable electronic device. For example, the quantity of aerosol delivered during each puff may be adjusted, an illumination scheme (e.g., using the indicator 518) may be adjusted, and various other functions may be controlled or adjusted.

In an additional embodiment an accessory device operation method is provided. As illustrated in FIG. 18, the method may include providing an accessory device comprising a case and an interface at operation 900. Additionally, the method may include providing for insertion of a portable electronic device and at least a portion of an aerosol delivery device comprising a battery into the case at operation 902. Further, the method may include establishing an electrical connection between the portable electronic device and the battery of the aerosol delivery device removably received in the case through the interface at operation 904.

As further illustrated in FIG. 18, the method may include additional optional operations. In this regard, the method may further comprise charging the battery of the aerosol delivery device through the electrical connection at operation 906. Additionally, the method may include activating an indicator of the aerosol delivery device at operation 908, which may be conducted while charging the battery at operation 906. Further, the method may include establishing a data connection between the portable electronic device and the aerosol delivery device through the interface at operation 910. The method may additionally include transferring a plurality of usage data from the aerosol delivery device to the portable electronic device at operation 912.

In another embodiment a method for charging may comprise establishing an electrical connection between a portable electronic device and a battery of an aerosol delivery device through an interface, wherein the portable electronic device is selected from a group consisting of a personal digital assistant, a cellular telephone, a smartphone, and a digital media player.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An accessory device, comprising:
   a case defining a first cavity configured to receive a portable electronic device and a second cavity configured to receive at least a portion of an aerosol delivery device comprising a battery; and
   an interface configured to establish an electrical connection between the aerosol delivery device and the portable electronic device, the interface comprising:
      a first connector positioned at the first cavity and configured to connect to the portable electronic device;
      a second connector positioned at the second cavity configured to connect to the aerosol delivery device; and
      a circuit extending between the first connector and the second connector,
   the case being configured such that the portable electronic device and the aerosol delivery device are removable therefrom,
   the interface being configured such that the first connector disconnects from the portable electronic device upon removal of the portable electronic device from the case and the second connector disconnects from the aerosol delivery device upon removal of the aerosol delivery device from the case.

2. The accessory device of claim 1, wherein the case is configured to receive a control body of the aerosol delivery device in the second cavity.

3. The accessory device of claim 2, wherein the case is configured such that an indicator on the control body is visible when the control body is received in the second cavity.

4. The accessory device of claim 2, wherein the case further comprises a third cavity configured to receive a cartridge of the aerosol delivery device.

5. The accessory device of claim 4, wherein the second cavity defines an opening at a longitudinal end of the case and the third cavity defines an opening at an opposing longitudinal end of the case.

6. The accessory device of claim 1, wherein the case comprises a front cover and a rear cover, the front cover and the rear cover being configured to lock together in a closed configuration to retain the portable electronic device in the first cavity and allow for insertion and removal of the aerosol delivery device.

7. The accessory device of claim 1, wherein the interface is configured to cause the portable electronic device to charge the battery.

8. The accessory device of claim 1, wherein the interface is configured to establish a data connection between the portable electronic device and the aerosol delivery device.

9. The accessory device of claim 1, wherein the interface is configured to allow for connection of an additional accessory device to the portable electronic device.

10. An accessory device operation method, comprising:
    providing an accessory device comprising a case and an interface,
       the case defining a first cavity and a second cavity,
       the interface comprising:
          a first connector positioned at the first cavity;
          a second connector positioned at the second cavity; and
          a circuit extending between the first connector and the second connector;
    providing for insertion of a portable electronic device into the first cavity of the case and into engagement with the first connector;
    providing for insertion of at least a portion of an aerosol delivery device comprising a battery into the second cavity of the case and into engagement with the second connector;
    establishing an electrical connection between the portable electronic device and the battery of the aerosol delivery device through the interface;
    providing for removal of the portable electronic device from the first cavity and disconnection of the portable electronic device from the interface upon removal; and
    providing for removal of the aerosol delivery device from the second cavity and disconnection of the aerosol delivery device from the interface upon removal.

11. The method of claim 10, further comprising charging the battery of the aerosol delivery device through the electrical connection.

12. The method of claim 11, further comprising activating an indicator of the aerosol delivery device while charging the battery.

13. The method of claim 10, further comprising establishing a data connection between the portable electronic device and the aerosol delivery device through the interface of the accessory device.

14. The method of claim 13, further comprising transferring a plurality of usage data from the aerosol delivery device to the portable electronic device.

15. The method of claim 10, wherein the portable electronic device is selected from a group consisting of a personal digital assistant, a cellular telephone, a smartphone, and a digital media player.

16. A computer program product comprising at least one tangible computer-readable storage medium having computer-executable program code portions stored therein that, when being executed, command a computer, the computer-executable program code portions comprising:

program code instructions providing for charging a battery of an aerosol delivery device in an accessory device comprising an interface and a case through an electrical connection established by the interface between a portable electronic device and the aerosol delivery device when the portable electronic device and the aerosol delivery device are inserted into the case, wherein the portable electronic device is selected from a group consisting of a personal digital assistant, a cellular telephone, a smartphone, and a digital media player.

17. The computer program product of claim 16, further comprising program code instructions for activating an indicator of the aerosol delivery device while charging the battery.

18. The computer program product of claim 16, further comprising program code instructions for establishing a data connection between the portable electronic device and the aerosol delivery device.

19. The computer program product of claim 18, further comprising program code instructions for transferring a plurality of usage data from the aerosol delivery device to the portable electronic device.

20. The computer program product of claim 19, further comprising program code instructions for indicating a remaining capacity of a cartridge of the aerosol delivery device.

21. The computer program product of claim 18, further comprising program code instructions for transferring a software update to the aerosol delivery device.

22. A method for charging, comprising:

establishing an electrical connection between a portable electronic device and a battery of an aerosol delivery device through an interface of an accessory device when the portable electronic device and the aerosol delivery device are received in a case of the accessory device; and charging the battery of the aerosol delivery device by transferring current from the portable electronic device through the interface, wherein the portable electronic device is selected from a group consisting of a personal digital assistant, a cellular telephone, a smartphone, and a digital media player.

* * * * *